United States Patent
Saegusa

[19]

[11] Patent Number: 6,076,735
[45] Date of Patent: Jun. 20, 2000

[54] BAR CODE SCANNING APPARATUS HAVING A PLURALITY OF FIXED MIRRORS WHICH REFLECT SCANNING BEAMS IN ORTHOGONAL PLANES

[75] Inventor: Shinji Saegusa, Numazu, Japan

[73] Assignee: Toshiba Tec Kabushiki Kaisha, Tokyo, Japan

[21] Appl. No.: 09/065,459

[22] Filed: Apr. 24, 1998

[30] Foreign Application Priority Data

Apr. 24, 1997 [JP] Japan ..................................... 9-107204
Feb. 24, 1998 [JP] Japan ................................. 10-042459

[51] Int. Cl.[7] .............................................. G02B 26/00
[52] U.S. Cl. ................................. 235/462.4; 235/462.36; 235/462.38; 235/462.43
[58] Field of Search .................. 235/462.14, 462.36, 235/462.37, 462.38, 462.39, 462.4, 462.43, 462.35

[56] References Cited

U.S. PATENT DOCUMENTS

| | | | |
|---|---|---|---|
| 4,652,732 | 3/1987 | Nickl | 235/462.4 |
| 4,713,532 | 12/1987 | Knowles | 235/462.4 |
| 5,043,563 | 8/1991 | Chi et al. | 235/462.4 |
| 5,115,122 | 5/1992 | Jwo et al. | 235/462.4 |
| 5,229,588 | 7/1993 | Detwiler et al. | 235/462.35 |
| 5,268,565 | 12/1993 | Katoh et al. | 235/462.31 |
| 5,286,961 | 2/1994 | Saegusa | 235/462.4 |
| 5,459,308 | 10/1995 | Detwiler et al. | 235/462.35 |
| 5,689,102 | 11/1997 | Schonenberg et al. | 235/462.38 |
| 5,886,336 | 3/1999 | Tang et al. | 235/462.43 |

*Primary Examiner*—Thien M. Le
*Assistant Examiner*—Diane I. Lee
*Attorney, Agent, or Firm*—Oblon, Spivak, McClelland, Maier & Neustadt, P.C.

[57] ABSTRACT

A bar code scanning apparatus having a laser beam source 1, a scanner 7 for scanning a laser beam 2 emitted from the laser beam source 1 in an scan angle range of $-\theta_1$ to $+(\theta_1+\theta_2)$ relative to the laser beam, a window 5 substantially perpendicular to a counter surface and which transmits therethrough scan beams scanned by the scanner 7 to the exterior of the reader, a plurality of first fixed mirrors 8A, 8B and 8C for dividing scan beams, which are generated within the scan angle range of $-\theta_1$ to $+\theta_1$, into a plurality of scanning lines generally symmetric with respect to the laser beam and emitting the scanning lines from the window 5, and a plurality of second fixed mirrors 26A, 26B1 and 26B2 for dividing scan beams which are generated within the scan angle range of $+\theta_1$ to $+\theta_2$ and emitting the resulting scanning lines from the window 5 toward a checkout counter. Thus, it is possible to permit reading of a bar code by merely moving a commodity taken out from an incoming-side basket into an outgoing-side basket without changing the manner of holding the commodity and without changing the direction of the commodity.

7 Claims, 27 Drawing Sheets

DIRECTION TOWARD
CHECK OUT COUNTER

DIRECTION TOWARD CHECK OUT COUNTER

BAR CODE SCANNING APPARATUS HAVING A PLURALITY OF FIXED MIRRORS WHICH REFLECT SCANNING BEAMS IN ORTHOGONAL PLANES

BACK GROUND OF THE INVENTION

1. Field of the Invention

The present invention relates to a laser scan type bar code scanning apparatus for use in large-scale mass sales stores. Particularly, the invention is concerned with a bar code scanning apparatus suitable for a vertical type checkout lane.

2. Description of the Prior Art

A conventional bar code scanning apparatus of this type will now be described with reference to FIGS. 20 to 31. Laser beam 2 emitted from a laser beam source 1 comprising a lasor diode and a collimator lens passes a routing mirror 101 and then passes through an aperture 4 of an apertured concave mirror 4, which mirrors are disposed above the laser beam source 1, and enters a rotary scan mirror 7 as a scanner having a rotational axis 6 nearly parallel to the normal line direction of a window 5 and further having four reflective surfaces, the rotary scan mirror 7 being attached to a brushless DC motor (not shown).

By the rotary scan mirror 7, the laser beam 2 emitted from the laser beam source 1 is reflected and scanned as scan beams 9 in the directions of a plurality of fixed mirrors 8A, 8D1, 8B, 8E1 and 8C which are disposed around the rotary scan mirror 7. The scan beams 9 are reflected by the fixed mirrors 8A, 8B, 8C, also by two fixed mirrors 8D1 and 8D2 for a series of reflections, and likewise by two fixed mirrors 8E1 and 8E2 for a series of reflections, then pass through the window 5 and travel obliquely upward with respect to the window.

When the scan beams emitted to the exterior intersect a bar code label printed on a commodity (not shown) which passes above the bar code scanning apparatus in a commodity advancing direction 14, the beams are reflected while being modulated by black and white of the bar code, and the thus modulated and reflected beams pass through the window 5, then pass any of the fixed mirrors and further pass the rotary scan mirror 7. In this way the modulated and reflected beams return through the interior of the reader. The beams are then focused on a photo sensor 10 by a concave reflective surface as an outer peripheral surface of the aperture 4 of the apertured concave mirror 3 located ahead of those mirrors and also by a lens 106. Further, an optical band pass filter 105 for eliminating an optical noise is disposed on the inner side of the lens 106.

The thus-focused reflected beam on the photo sensor 10 is converted to an electric signal by the photo sensor 10, which electric signal is then converted to the digital signal by an electronic circuit mounted on a circuit board 102. Further, the bar code is decoded by a decode circuit 103.

The bar code scanning apparatus of such a construction is required to be sufficiently long and is also required to generate scanning lines emitted at an optimal angle. To meet these requirements it is necessary to provide scan beams 9 of about 150° to 180°. For this reason there usually is employed, as the rotary scan mirror 7, a rotary scan mirror having four or five reflective surfaces. In the conventional bar code scanning apparatus being considered, the rotary scan mirror 7 is formed in a tetrahedral prismatic shape having different inclination angles. The rotational axis 6 is perpendicular to the plane of the window 5 and is located in a plane which includes the laser beam 2. Therefore, the laser beam 2 incident thereon scans an area symmetric with respect to the laser beam, namely an area of $-\theta_1$ to $+\theta_1$ in terms of scan angles. Seven fixed mirrors 8A, 8B, 8C, 8D1, 8D2, 8E1 and 8E2 are arranged around the rotary scan mirror 7 so as to be symmetric with respect to the laser beam 2. The laser beam scanned by the rotary scan mirror 7 is divided into five scanning beams 5 as scanning lines 11A, 11B, 11C, 11D and 11E in five directions in the window 5, as shown in FIG. 23. Likewise, scanning lines 13A, 13B, 13C, 13D and 13E in five directions are described in a virtual plane 12 perpendicular to the window 5.

In FIG. 23, it is the scanning lines 11A and 13A that are generated by the fixed mirror 8A, it is the scanning lines 11D and 13D that are generated by the combination of fixed mirrors 8D1 and 8D2, it is the scanning lines 11B and 13B that are generated by the fixed mirror 8B, it is the scanning lines 11E and 13E that are generated by the combination of fixed mirrors 8E1 and 8E2, and it is the scanning lines 11C and 13C that are generated by the fixed mirror 8C.

In FIG. 23 there is described only one scanning line in each direction for the purpose of simplification, but since the rotary scan mirror 7 in a tetrahedral prism shape having different inclination angles scans the laser beam 2, there actually are generated four, nearly parallel scanning lines in each direction, as shown in FIG. 24.

The scanning lines 11A, 11B, 11C, 11D, 11E, 13A, 13B, 13C, 13D and 13E thus generated are symmetric with respect to a commodity advancing direction 14 and the laser beam 2, so that allowable reading posture ranges of a bar code label 15 printed on a commodity which passes above the bar code scanning apparatus also symmetric ranges for a predetermined initial posture. For example, if the posture of a commodity tilted about 45° relative to the window 5 as in FIG. 24 is assumed to be an initial posture of the commodity, conventional readers can tolerate bar code postures in the following ranges:

(a) Rotation around Yaw axis 16
$-45° \leq \text{Yaw} \leq +45°$
(b) Rotation around Pitch axis 17
$-45° \leq \text{Pitch} \leq +45°$
(c) Rotation around Rotate axis 18
$-180° \leq \text{Rotate} \leq +180°$ The bar code scanning apparatus thus constructed is widely used, for example, in a vertical type checkout counter lane in which the reader, indicated at 19, is embedded in a vertical wall surface 21 of a checkout counter 20 which has a horizontal counter surface, as shown in FIG. 25. In such an application, as shown in the same figure, the bar code scanning apparatus is disposed so that the vertical virtual plane 12 of the reader 19 faces in the commodity advancing direction, and an operator takes a commodity 23 from the interior of an incoming-side basket 22 and reads the bar code of the commodity through the reader 19 before the commodity is transferred into an outgoing-side basket 24.

In this case, since the commodity 23 is handled by the operator, the posture of the commodity varies over a wide range depending on how to hold the commodity and the shape of the commodity. Therefore, in order that the whole reading range of the reader 19 can be utilized effectively, the reader 19 is disposed in such a manner that the foregoing allowable bar code reading posture range is symmetric with respect to the commodity advancing direction. The details of this point are disclosed in Japanese Patent Laid Open Nos.17178/89, 133277/88 and 48017/89.

The disadvantages of the above art are described below. In a large-scale mass sales store, fresh foods such as raw fish, meat, fish and daily dishes are arranged for sale in large quantities. These foods are wrapped in thin containers of polystyrene foam called trays such as that shown in FIG. 26. However, it is almost impossible for the conventional bar code scanning apparatus to read the bar code label 15 which comes in with face up (Yaw=−90°). Consequently, the operator is required to bring down the tray up to an angle at which the reader 19 can read the bar code label 15, that is, up to an angle of Yaw=−45° or so, as shown in FIG. 27.

On the other hand, in the case of a tray containing a fresh food or the like, if the tray is tilted or turned upside down, a liquid in the tray may spill onto a counter, or if the contents on the tray are raw fish, the arranged form of the raw fish may not be kept. Therefore, the operator is required to tilt the commodity 23 as in FIG. 27 and read the bar code of the commodity in the tilted posture of the commodity while taking care to keep the arrangement in the tray or not to spill a liquid from the tray. Thus, the speed of commodity registration is far lower than that for other commodities.

In Japanese Patent Laid Open No.129583/91 is disclosed such a vertical type checkout lane as shown in FIG. 28 in which a bar code scanning apparatus 19 is disposed so that a vertical virtual plane 12 thereof is parallel to a checkout counter 20, whereby it is intended to improve the reading performance for the foregoing upward facing label.

According to the construction disclosed therein, since scanning lines are emitted downward from above, a bar code label which faces upward can be read in a satisfactory manner. However, as shown in FIG. 29, a bar code label 15 which comes in, for example, at a Rotate angle of 0°, a Pitch angle of 45° (perpendicular to the window surface) and a Yaw angle of 0° and scanning lines radiated downward toward a checkout counter 20 do not intersect in a satisfactory manner, so that it is impossible to read the bar code label 15 of a commodity 23 which comes in at such a posture.

In reading a bar code or a bar code label printed on a heavy commodity such as a pet bottle, the operator holds the cap portion of the pet bottle with one hand and performs scanning in an upright posture of the pet bottle, so that the surface of the bar code label 15 is opposed to the window 5, as shown in FIG. 30. However, as noted previously, scanning lines are emitted downward on this side from above, so if the bar code label 15 passes a position higher than the center of the window 5, the scanning lines and the bar code label 15 will not intersect each other in a satisfactory manner.

On the other hand, in Japanese Patent Laid Open Nos. 99381/91 and 25583/91 there is disclosed such an apparatus as shown in FIG. 31 in which scanning lines are emitted downward from a small bar code scanning apparatus 19 disposed above a checkout counter 20, thereby making it possible to read a bar code label 15 which faces upward. Also in this case, since scanning lines are radiated from above to below, it is possible to correctly read a bar code 15A printed on the upper surface of a commodity 23. However, as to a bar code 15B printed in a direction perpendicular to the upper surface of the commodity, scanning lines do not intersect it in a satisfactory manner. For the same reason, in the case of a heavy commodity such as a pet bottle, it is necessary to hold the pet bottle horizontally with both hands.

Thus, the apparatus improved in their upward label reading performance are poor in their reading performance for bar code labels 15 facing in other directions than the upward direction. Therefore, it has so far been necessary for the operator to make scanning so that the labels of all commodities come to face upward. In other words, after taking out a commodity 23 from the incoming-side basket 22, the operator is required to change the manner of holding the commodity so that the label of the commodity faces upward. As to a heavy commodity such as a pet bottle, the operator is required to read its bar code while holding the commodity 23 with both hands. Thus, it has been impossible to effect a high-speed commodity registration.

SUMMARY OF THE INVENTION

It is an object of the present invention to provide a bar code scanning apparatus capable of reading a bar code of a commodity taken out from an incoming-side basket by only moving the commodity into an outgoing-side basket without changing the manner of holding the commodity or without changing the direction in which the commodity faces.

It is another object of the present invention to provide a bar code scanning apparatus capable of reading a bar code surely.

It is a further object of the present invention to provide a bar code scanning apparatus that the application to a checkout counter provided with a horizontal counter surface is easy.

It is a further object of the present invention to provide a bar code scanning apparatus capable of enlarging the arrangement area of fixed mirrors.

It is a further object of the present invention to provide a bar code scanning apparatus capable of reading a bar code which faces in a direction so far incapable of being read so that the reading of the bar code can be done by merely moving the commodity from inside the incoming-side basket into the outgoing-side basket without changing the manner of holding the commodity and without changing the direction of the commodity.

It is a further object of the present invention to provide a bar code scanning apparatus capable of changing the arrangement of components in the apparatus as necessary to attain an effective utilization of space.

It is a further object of the present invention to provide a bar code scanning apparatus capable of fabricating an apparatus in which scanning directions of scanning lines are opposite to each other so that it is easy to apply the apparatus to checkout lanes in which commodity moving directions are opposite to each other.

The present invention provides a bar code scanning apparatus comprising a laser beam source, a scanner for scanning a laser beam emitted from the laser beam source in a scan angle range of $-\theta_1$ to $+(\theta_1+\theta_2)$ relative to the laser beam, a window substantially perpendicular to a counter surface and which transmits therethrough scan beams scanned by the scanner to the exterior of the reader, a plurality of first fixed mirrors for dividing scan beams, which are generated within the scan angle of $-\theta_1$ to $+\theta_1$, into a plurality of scanning lines generally symmetric with respect to the laser beam and emitting the scanning lines from the window, and a plurality of second fixed mirrors for dividing scan beams which are generated within the scan angle range of $+\theta_1$ to $+\theta_2$ and emitting the resulting scanning lines from the window toward a checkout counter.

DETAILED DESCRIPTION OF THE PREFERRED EMBODIMENTS

Figure 1:
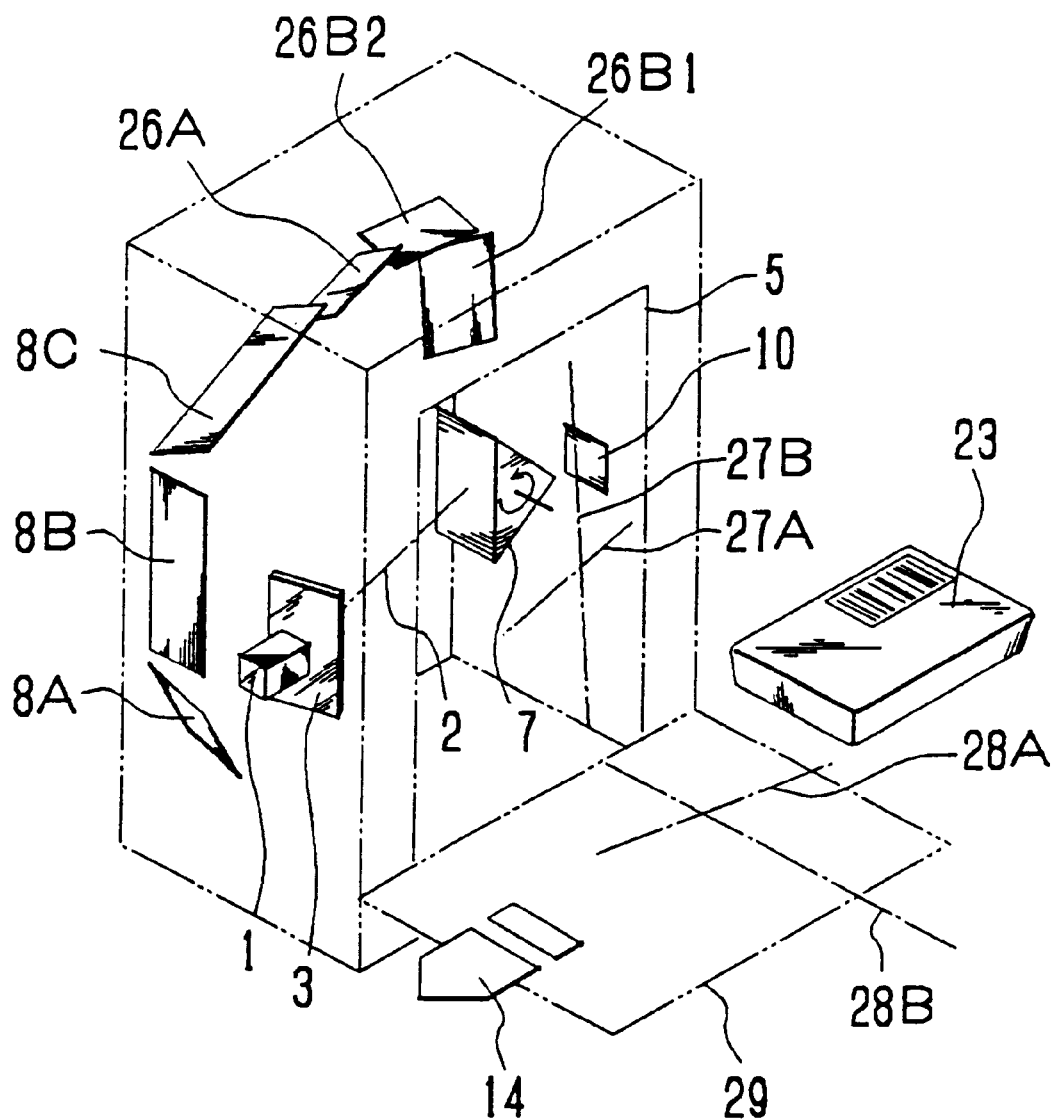
FIG. 1 is a perspective view showing an optical scan system used in the embodiment of the present invention.
Figure 2:
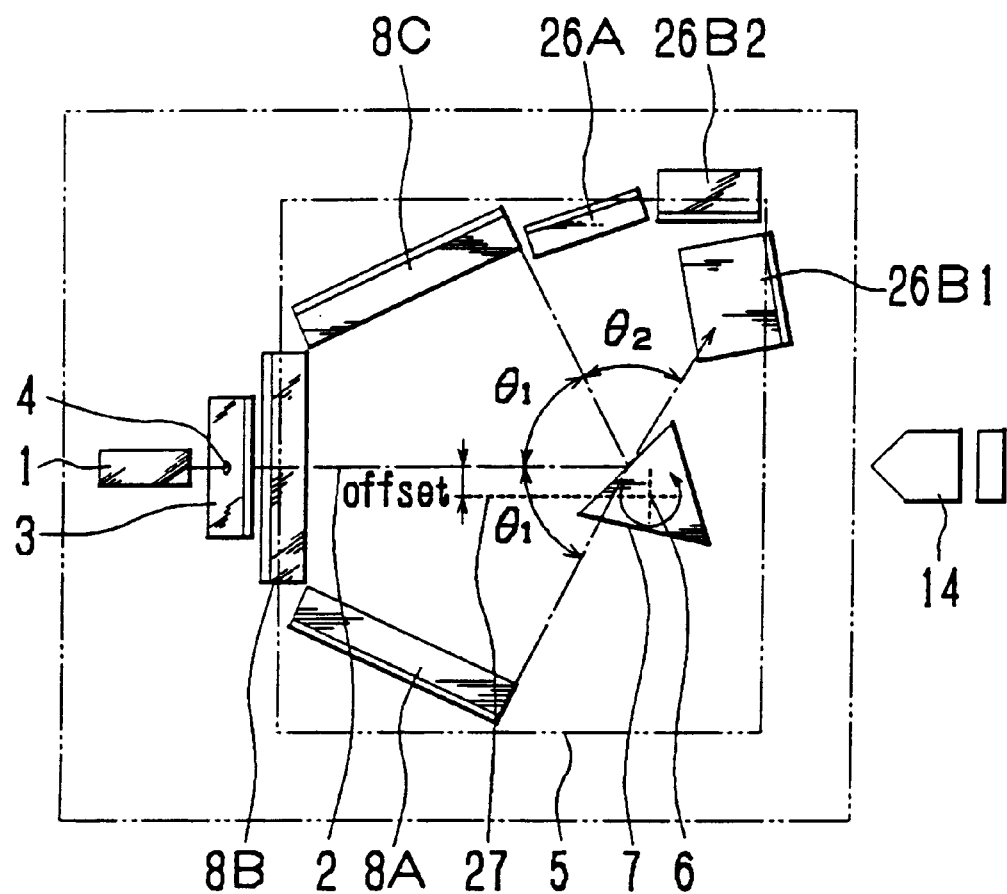
FIG. 2 is a plan view thereof.

The first embodiment of the present invention will now be described with reference to FIGS. 1 to 3. The same portions as in FIGS. 20 to 31 will be identified by the same reference numerals and explanations thereof will be omitted. A laser beam source 1, an apertured concave mirror 3, a photo sensor 10, a plurality of first fixed mirrors 8A, 8B, 8C, and a plurality of second fixed mirrors 26A, 26B1, 26B2, are attached to a housing through a holding member (not shown), the housing having a window 5 perpendicular to a horizontal counter surface of a checkout counter 20. Further, a rotary scan mirror 7 as a scanner having three reflective surfaces is mounted to the housing so that a rotational axis 6 thereof is located at a position deviated by offset (for example, a distance of $-L_2$) from a laser beam 2 emitted from the laser beam source 1 and traveling toward the rotary scan mirror 7.

In this construction, the laser beam 2 emitted from the laser beam source 1 passes through an aperture 4 of the apertured concave mirror 3 and enters the rotary scan mirror 7. Since the rotational axis of the rotary scan mirror 7 is displaced a predetermined amount of offset relative to the optical axis of the laser beam 2, the beam scans not only over the conventional range of $-\theta_1$ to $+\theta_1$ but also over the range of $+\theta_1$ to $+\theta_2$ which exceeds the conventional range.

The fixed mirrors 8A, 8B and 8C are arranged around the rotary scan mirror 7 in a generally symmetric manner relative to the laser beam 2 as is the case with the conventional arrangement. Scanning lines 11A, 11B, 11C, 13A, 13B and 13C in three directions are described on the window 5 and a virtual plane 12 both perpendicular to the counter surface, as shown in FIG. 3.

The plural second fixed mirrors 26A, 26B1 and 26B2 are also arranged around the rotary scan mirror 7. Of these fixed mirrors, the mirrors 26B1 and 26B2 describe scanning lines while making successive reflections between the two and are used as a set. Scan beams from the rotary scan mirror 7 are reflected from above to below in the apparatus by the fixed mirrors 26A, 26B1 and 26B2 and describe scanning lines (27A, 27B) in two directions on the window 5, also describing scanning lines (28A, 28B) in two directions on a virtual plane 29 located below and perpendicular to the window 5.

The scanning lines 27A and 28A, which extend horizontally on the window 5, are generated by the fixed mirror 26A, while the scanning lines 27B and 28B, which extend vertically on the window 5, are generated by the set of two fixed mirrors 26B1 and 26B2.

Figure 3:
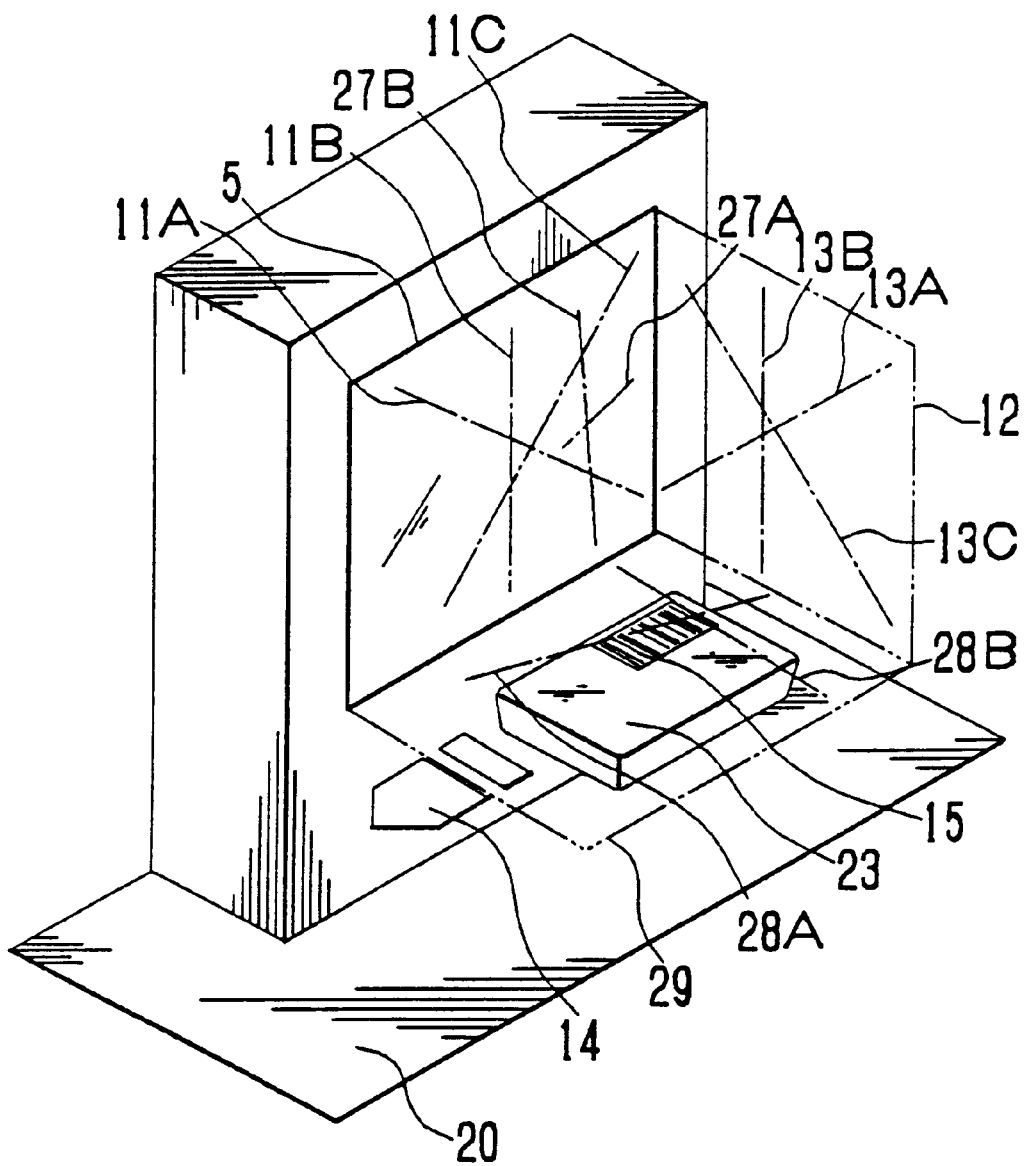
FIG. 3 is a perspective view showing a scanning state of scanning lines.
Figure 4:
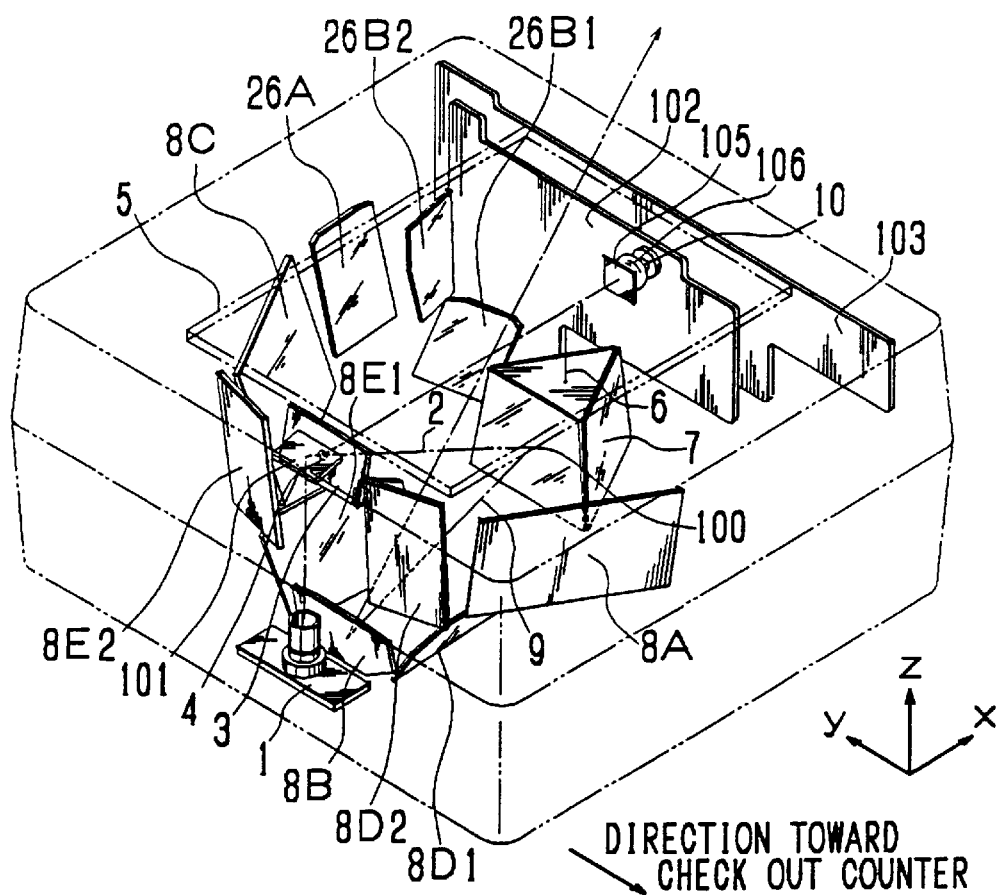
FIG. 4 is a perspective view showing an optical scan system used in the second embodiment of the present invention.

As shown in FIG. 3, the optical scan system thus constructed generates scanning lines 27A, 27B, 28A and 28B in two directions which are emitted toward the checkout counter 20 through the window 5 of the apparatus, in addition to the scanning lines 11A, 11B, 11C, 13A, 13B and 13C in three directions which have been explained in connection with the prior art. As in the prior art, the scanning lines 11A, 11B, 11C, 13A, 13B and 13C in three directions contribute to reading a bar code label 15 which advances in the commodity advancing direction 14 in the following postures:

(a) Rotation around Yaw axis 16
  $-45° \leq \text{Yaw} \leq +45°$ (b) Rotation around Pitch axis 17
  $-45° \leq \text{Pitch} \leq +45°$ (c) Rotation around Rotate axis
  $-180° \leq \text{Rotate} \leq +180°$ Further, the scanning lines 27A, 27B, 28A and 28B in two directions contribute to reading a bar code label 15 which is attached to a commodity 23 in a tray or the like and which faces upward.

The second embodiment of the present invention will be described below with reference to FIGS. 4 to 19. The same portions as in FIGS. 1 to 3 and FIGS. 20 to 31 will be identified by the same reference numerals and explanations thereof will be omitted.

A laser beam source 1, an apertured concave mirror 3, a photo sensor 10, an optical band-pass filter 105, a lens 106, a routing mirror 101, a substrate 102 with the photo sensor mounted thereon, a substrate 103 with a decode circuit mounted thereon, a plurality of first fixed mirrors 8A, 8B, 8C, 8D1, 8D2, 8E1 and 8E2, and a plurality of second fixed mirrors 26A, 26B1 and 26B2, are attached to an housing through a holding member (not shown). Further, a rotary scan mirror 7 as a scanner having three reflective surfaces is attached to the housing in such a manner that a rotational axis 6 of the rotary scan mirror is located at a position deviated by offset (for example, a distance of $-L_2$) from the laser beam 2 emitted from the laser beam source and advancing toward the rotary scan mirror 7.

In this construction, a laser beam 2 emitted from the laser beam source 1 passes the routing mirror 101, then passes through an aperture 4 of the apertured concave mirror 3 and enters the rotary scan mirror 7. Since the rotational axis 6 of the rotary scan mirror 7 is deviated a predetermined amount of offset from an optical axis of the laser beam 2, the laser beam scans not only the conventional angular range of $-\theta_1$ to $+\theta_1$ but also the angular range of $+\theta_1$ to $+\theta_2$.

Figure 11:
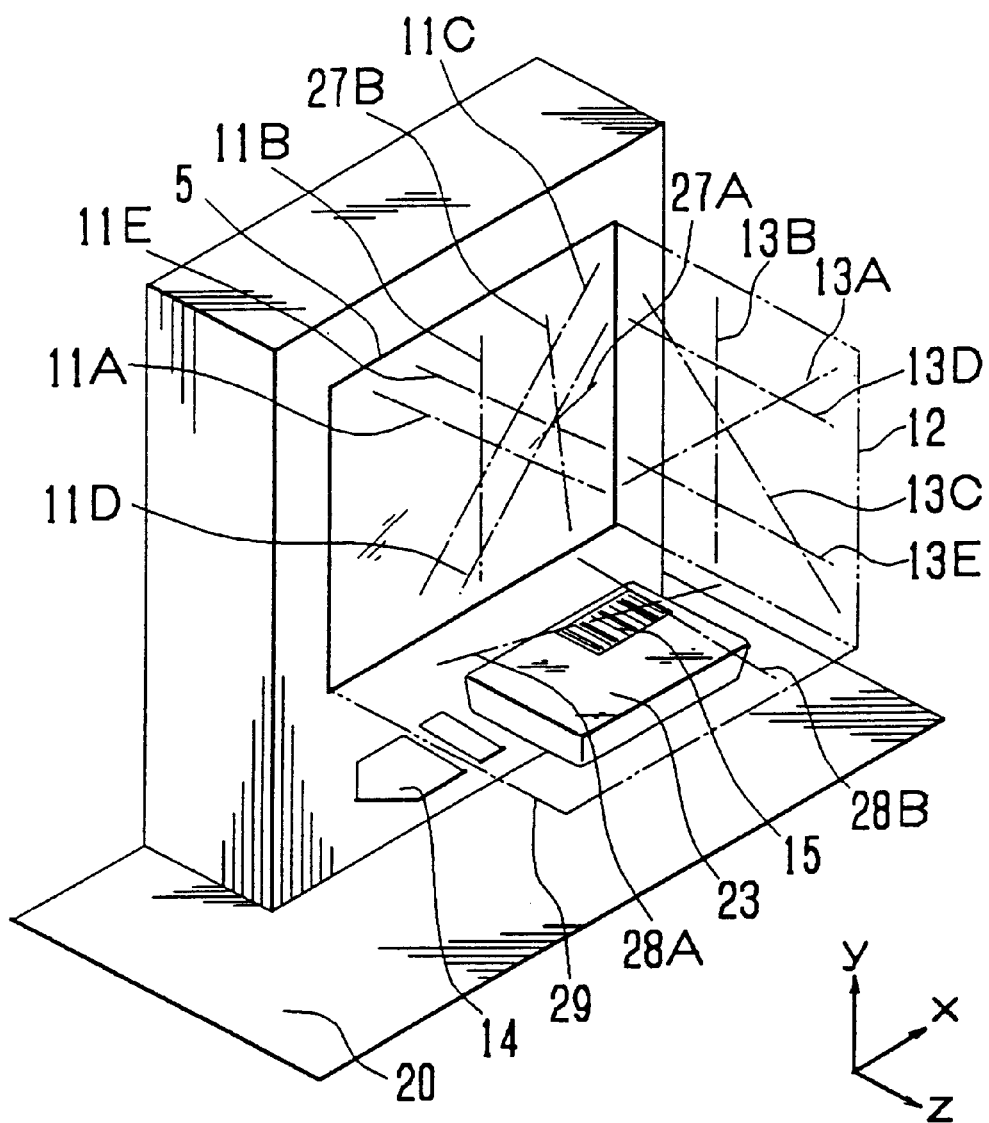
FIG. 11 is a perspective view showing a scanning state of scanning lines.

As in the prior art, around the rotary scan mirror 7 are arranged the fixed mirrors 8A, 8B, 8C, 8D1, 8D2, 8E1 and 8E2 in a generally symmetric manner with respect to the laser beam 2. When the rotary scan mirror 7 scans the laser beam 2 from $-\theta_1$ to $\theta_1$, there are described scanning lines 11A, 11B, 11C, 11D, 11E, 13A, 13B, 13C, 13D and 13E in five directions on a window 5 and also on a virtual plane 12 perpendicular to the window, as shown in FIG. 11.

Figure 13:
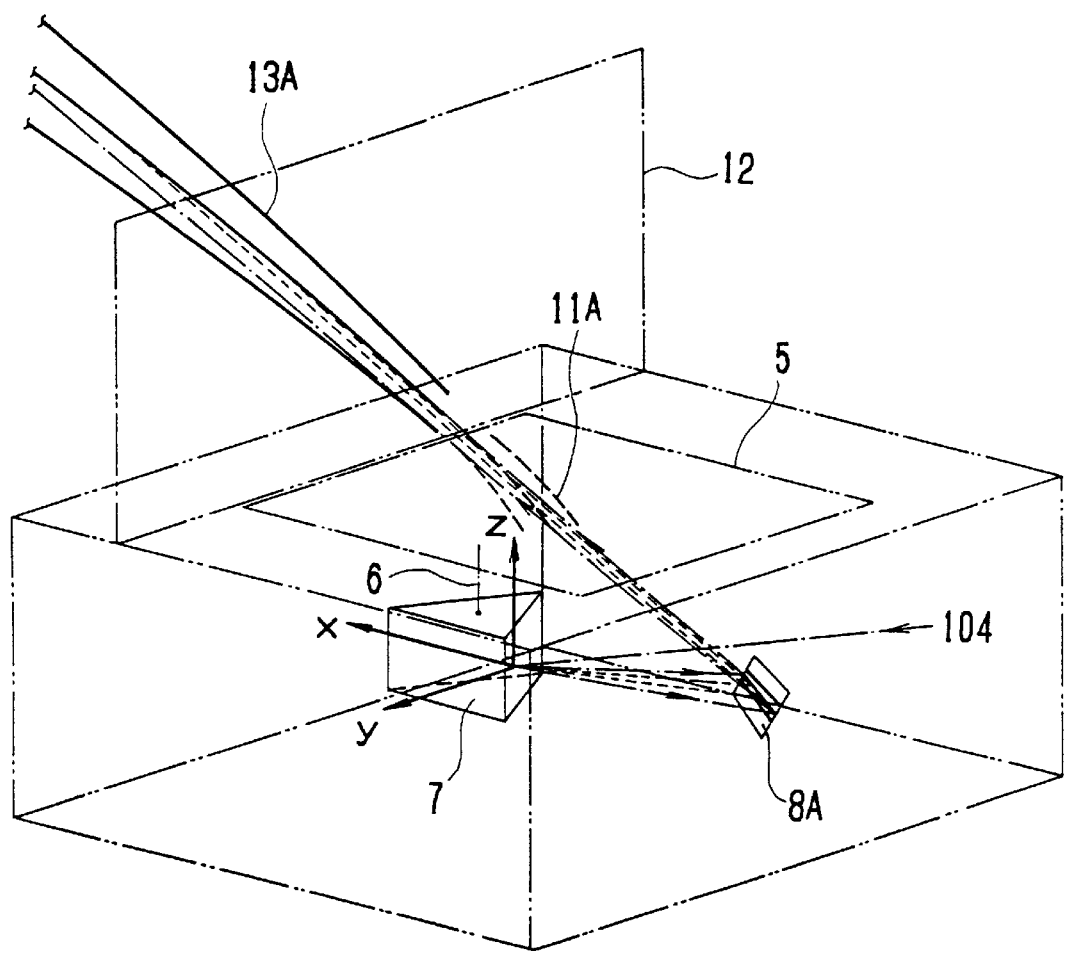
FIG. 13 is a perspective view showing the state of reflection by a fixed mirror 8A.
Figure 14:
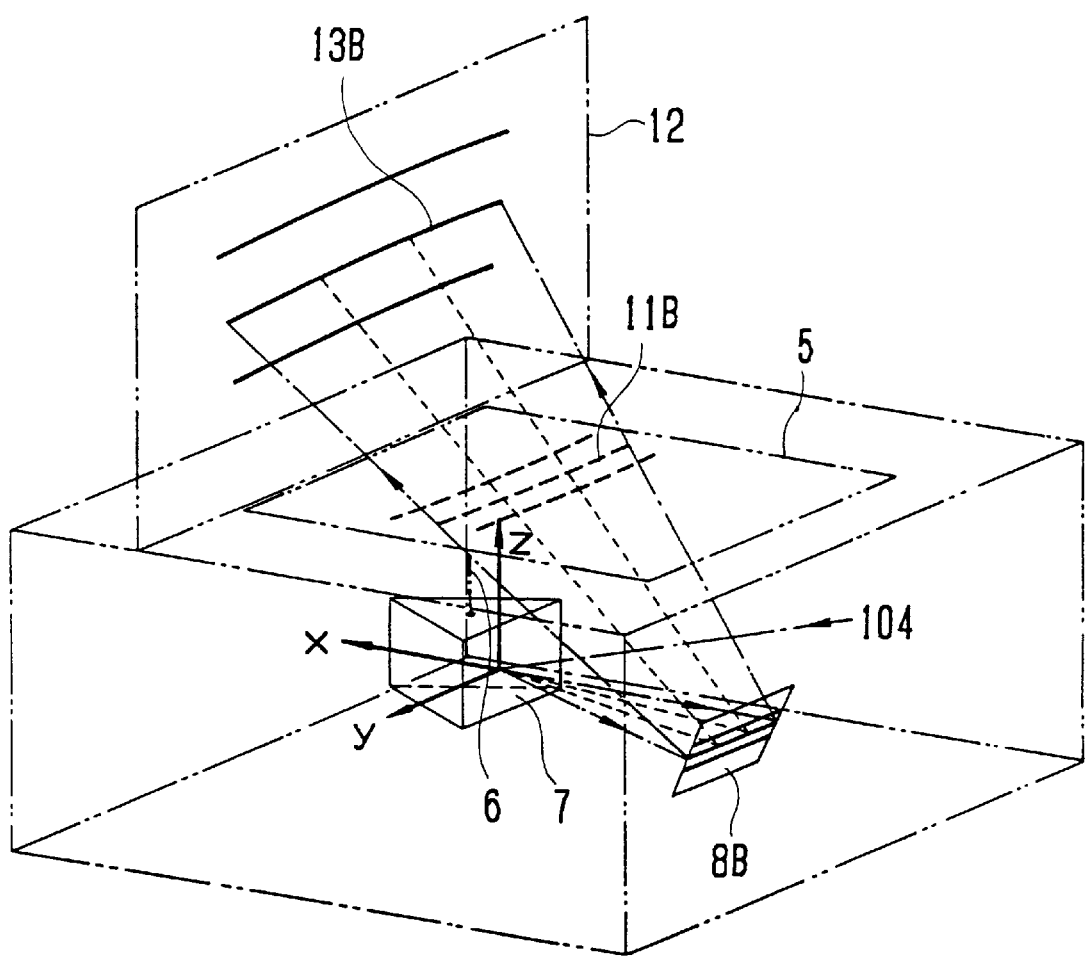
FIG. 14 is a perspective view showing the state of reflection by a fixed mirror 8B.
Figure 15:
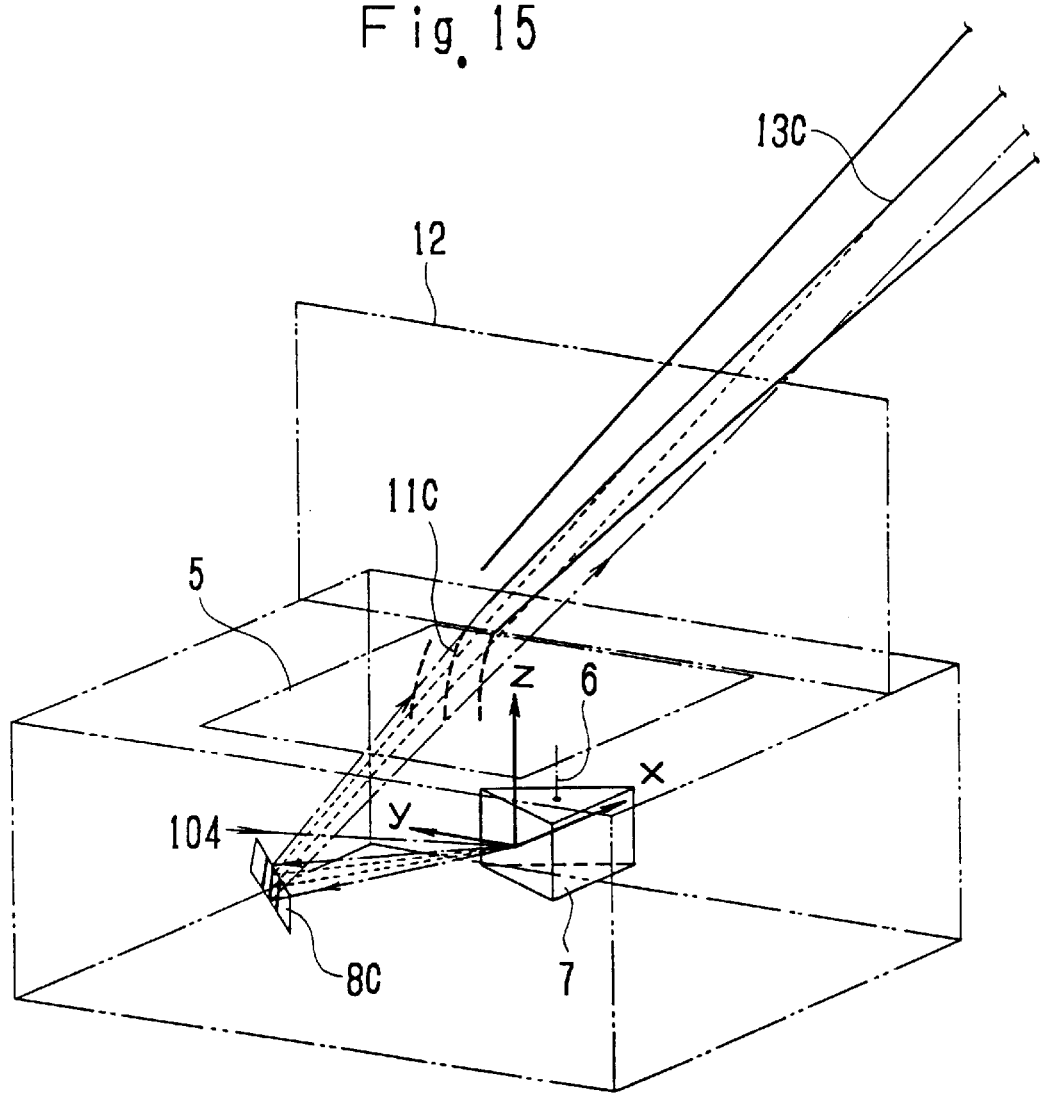
FIG. 15 is a perspective view showing the state of reflection by a fixed mirror 8C.
Figure 16:
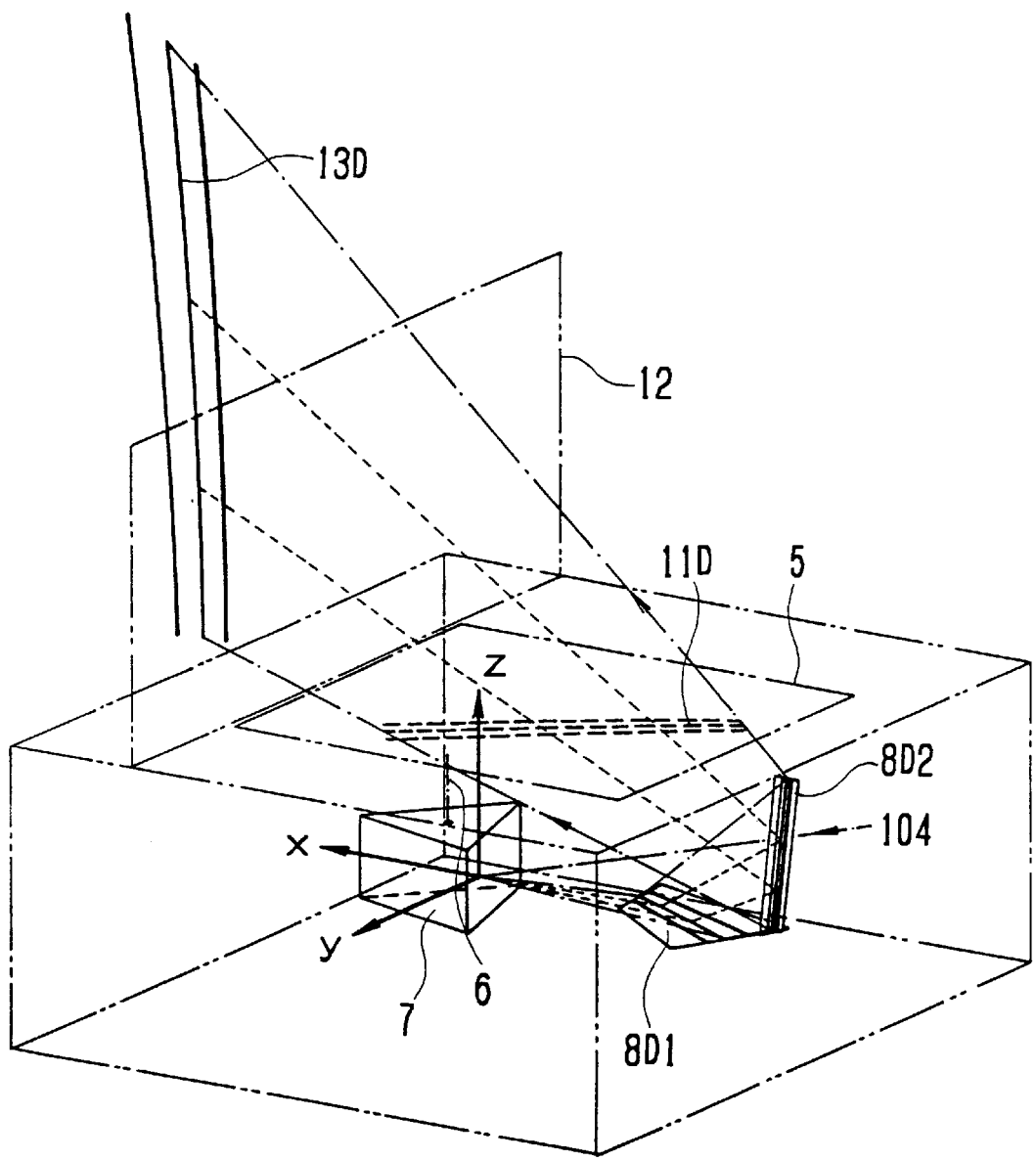
FIG. 16 is a perspective view showing the state of reflection by fixed mirrors 8D1 and 8D2.
Figure 17:
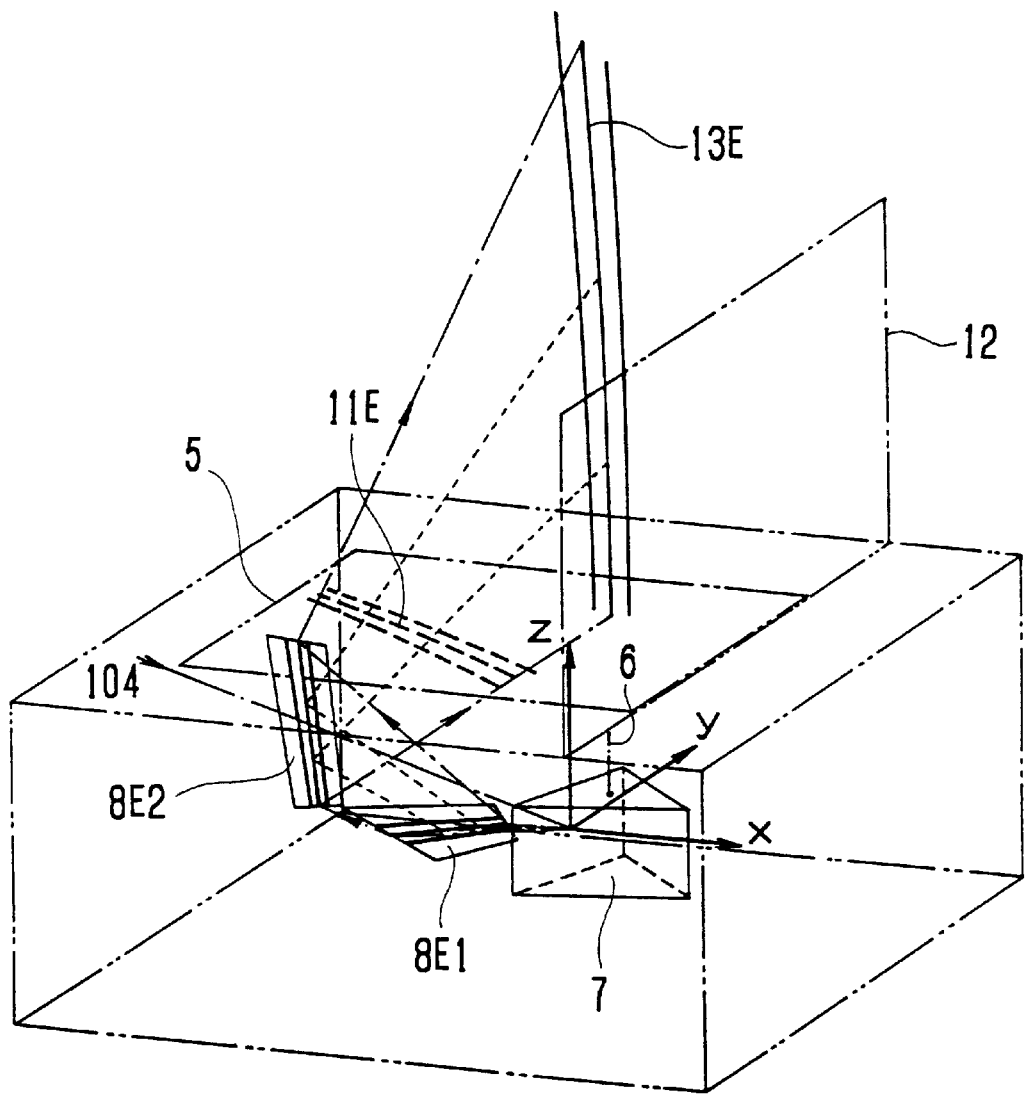
FIG. 17 is a perspective view showing the state of reflection by fixed mirrors 8E1 and 8E2.

FIGS. 13 to 17 show in what state the laser beam 2 is reflected by the fixed mirrors 8A, 8B, 8C, 8D1, 8D2, 8E1 and 8E2. More specifically, FIG. 13 shows the state of reflection by the fixed mirror 8A, FIG. 14 shows the state of reflection by the fixed mirror 8B, FIG. 15 shows the state of reflection by the fixed mirror 8C, FIG. 16 shows the state of reflection by the combination of fixed mirrors 8D1 and 8D2, and FIG. 17 shows the state of reflection by the combination of fixed mirrors 8E1 and 8E2.

Further, the plural, second fixed mirrors 26A, 26B1 and 26B2 are arranged around the rotary scan mirror 7, of which the fixed mirrors 26B1 and 26B2 act as a set of mirrors to perform a series of reflections. Scan beams 9 from the rotary scan mirror 7 are reflected downward from above in the apparatus by means of the fixed mirrors 26A, 26B1 and 26B2, describing scanning lines 27A and 27B in two directions on the window 5 and also describing scanning lines 28A and 28B in two directions on a virtual plane 29 located below and perpendicularly to the window 5. Thus, when the rotary scan mirror 7 scans the laser beam 2 from $\theta_1$ to $\theta_2$, scanning lines substantially orthogonal in two directions are emitted toward the counter 20.

Figure 18:
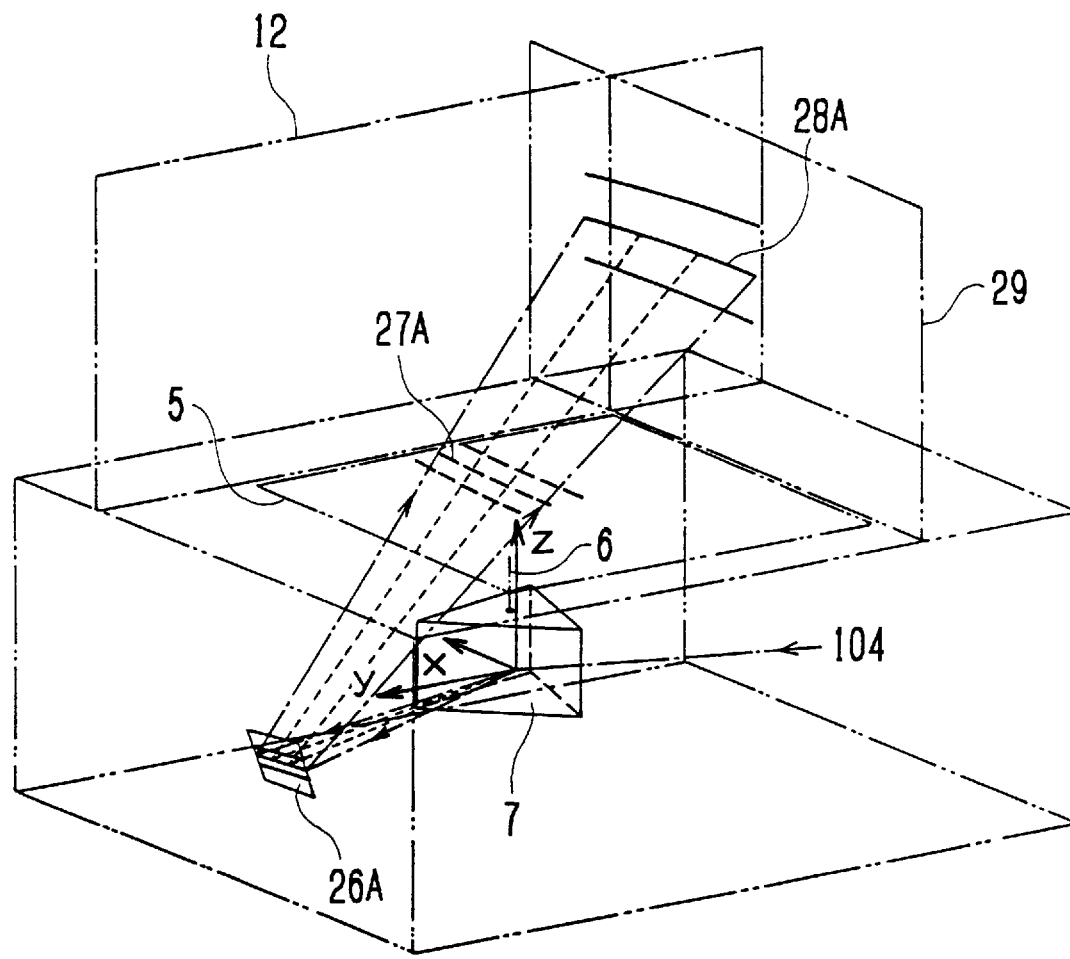
FIG. 18 is a perspective view showing the state of reflection by a fixed mirror 26A.
Figure 19:
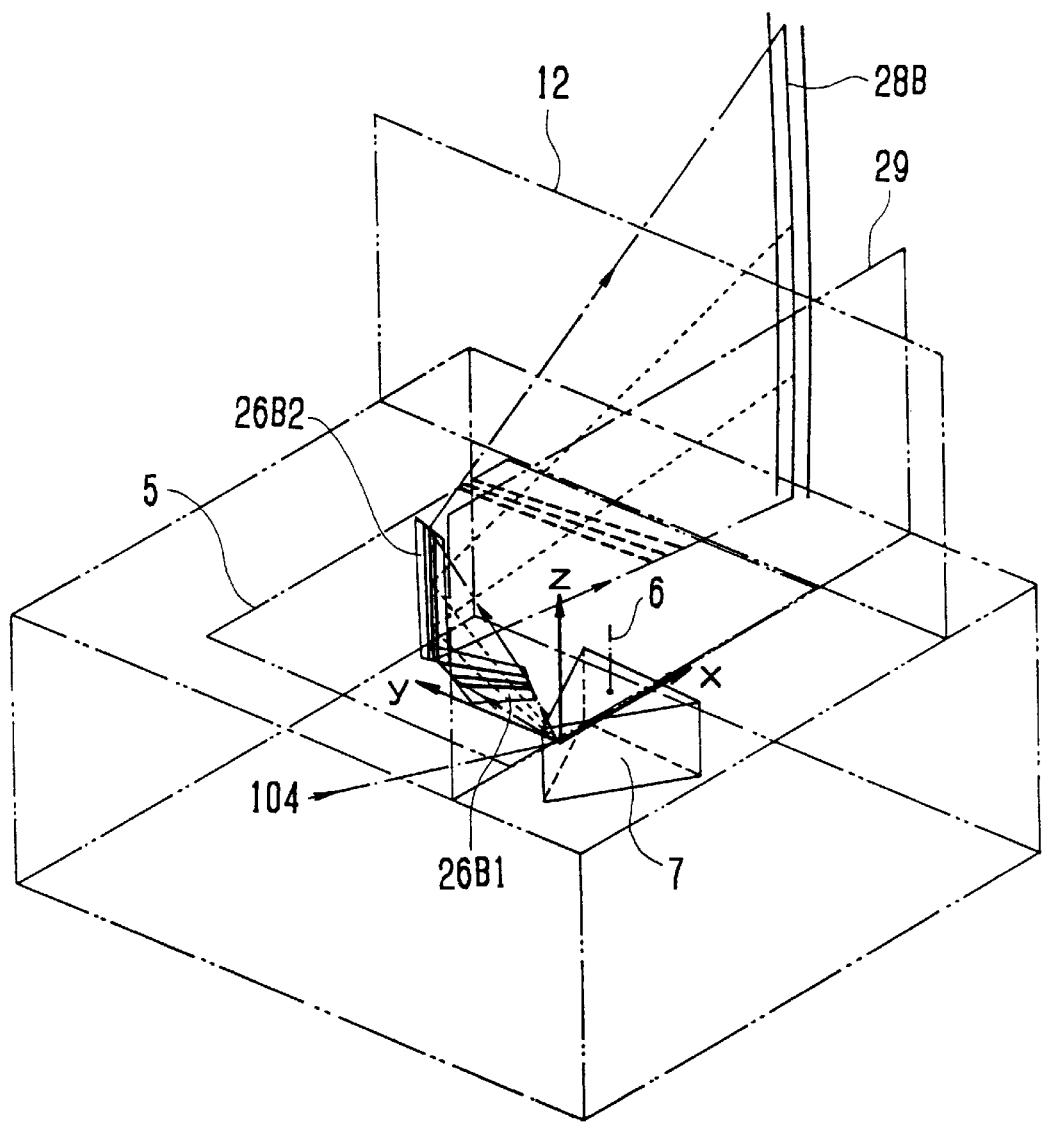
FIG. 19 is a perspective view showing the state of reflection by fixed rotary scan mirrors 26B1 and 26B2.
Figure 20:
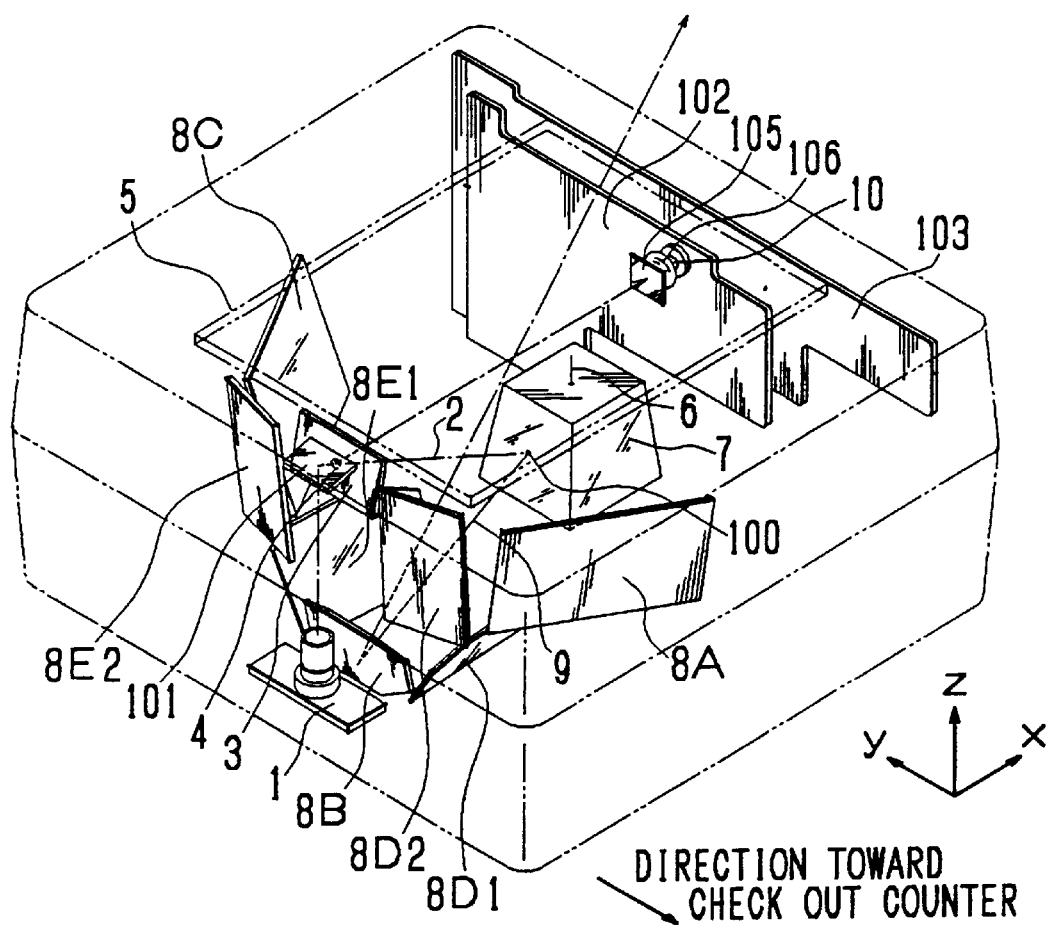
FIG. 20 is a perspective view showing an example of a conventional optical scan system.
Figure 21:
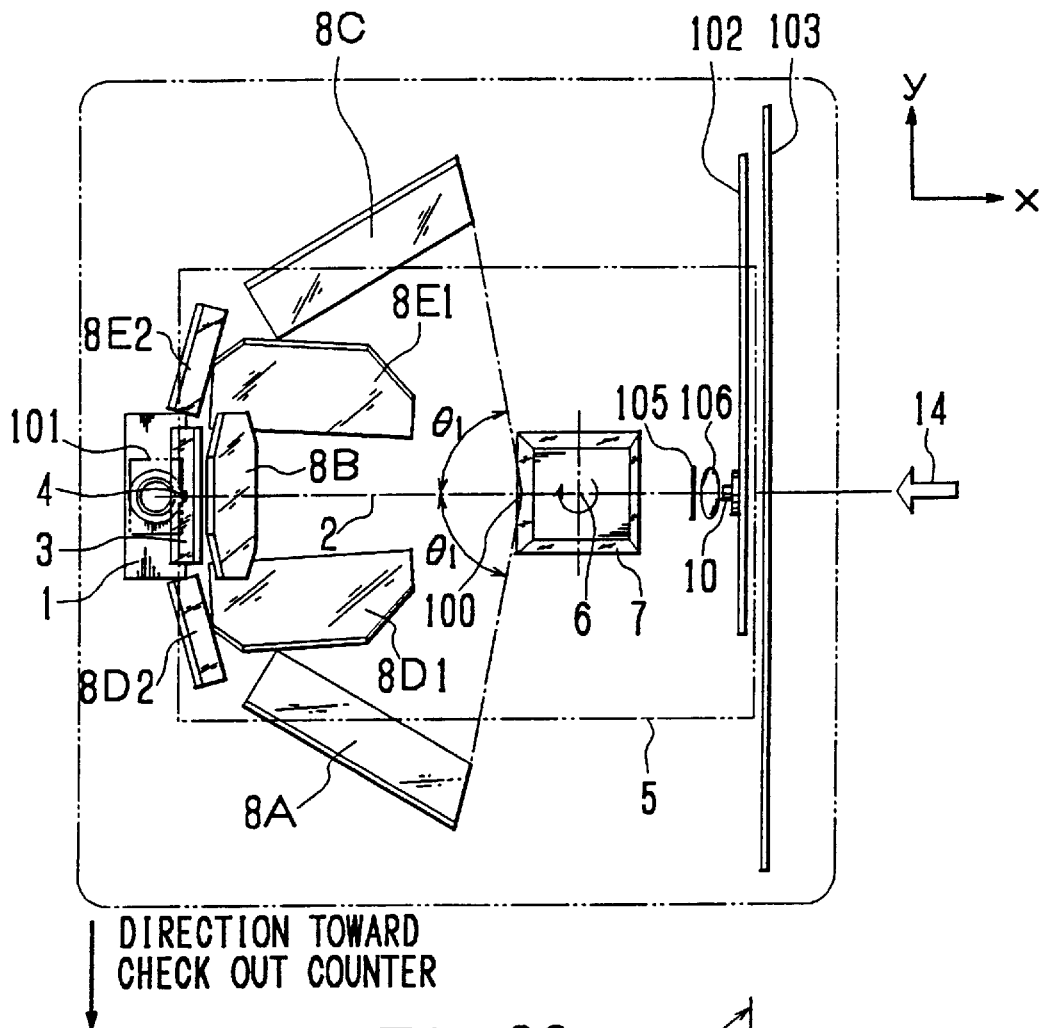
FIG. 21 is a plan view thereof.
Figure 22:
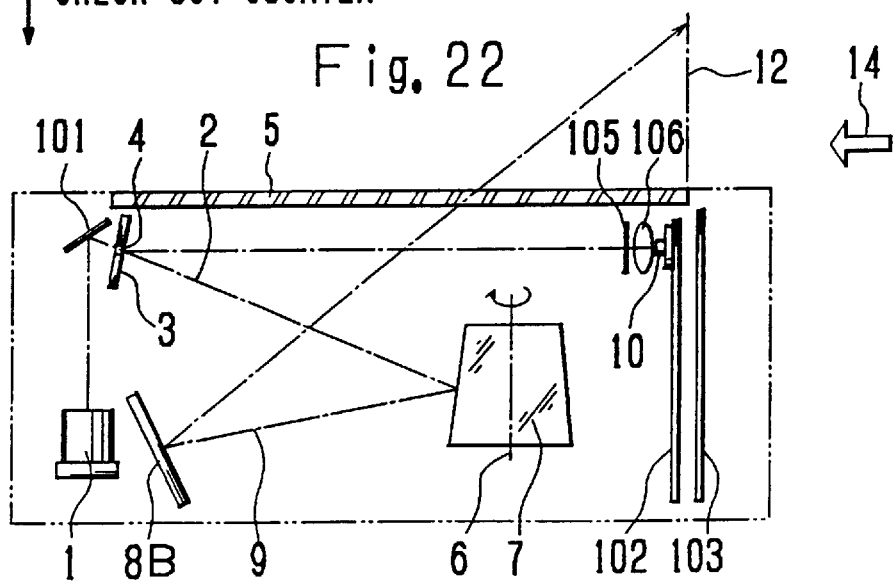
FIG. 22 is a front view in vertical section thereof.
Figure 23:
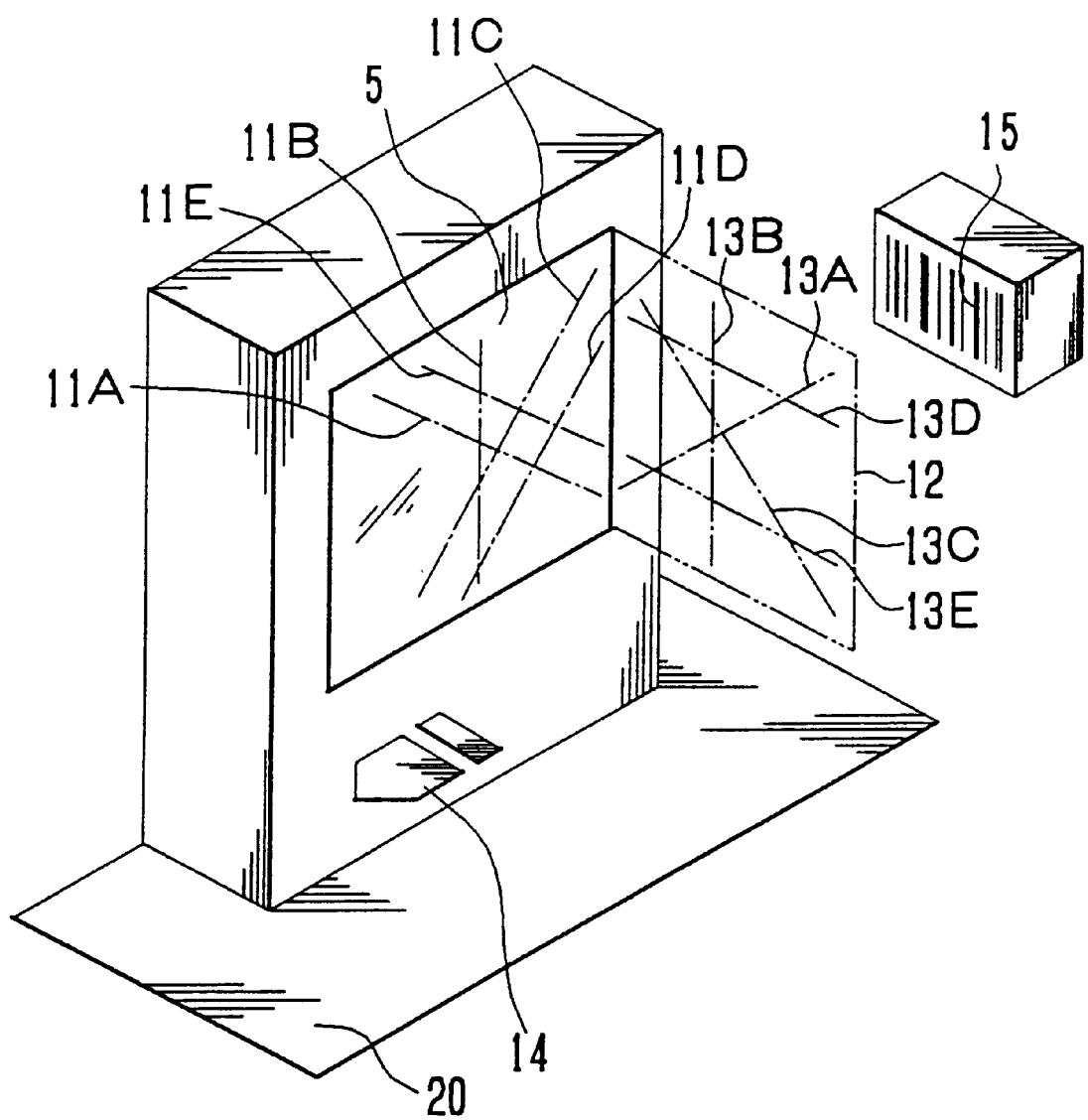
FIG. 23 is a perspective view showing an example of a vertical scanner.
Figure 24:
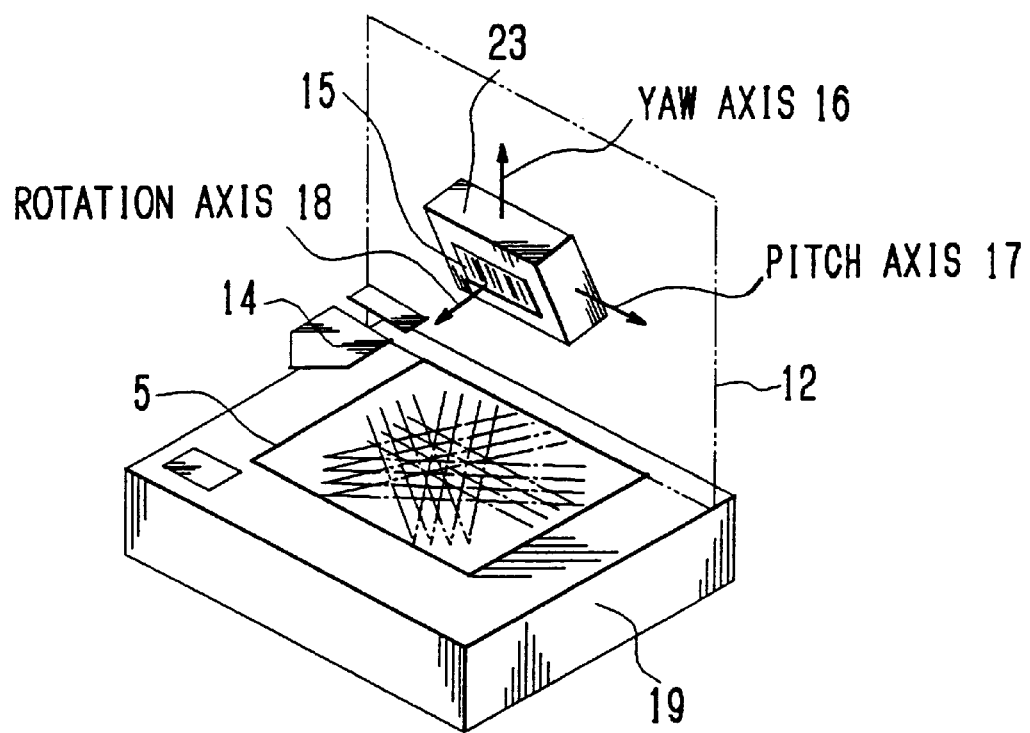
FIG. 24 is a perspective view for explaining the degree of freedom of a readable commodity posture.
Figure 25:
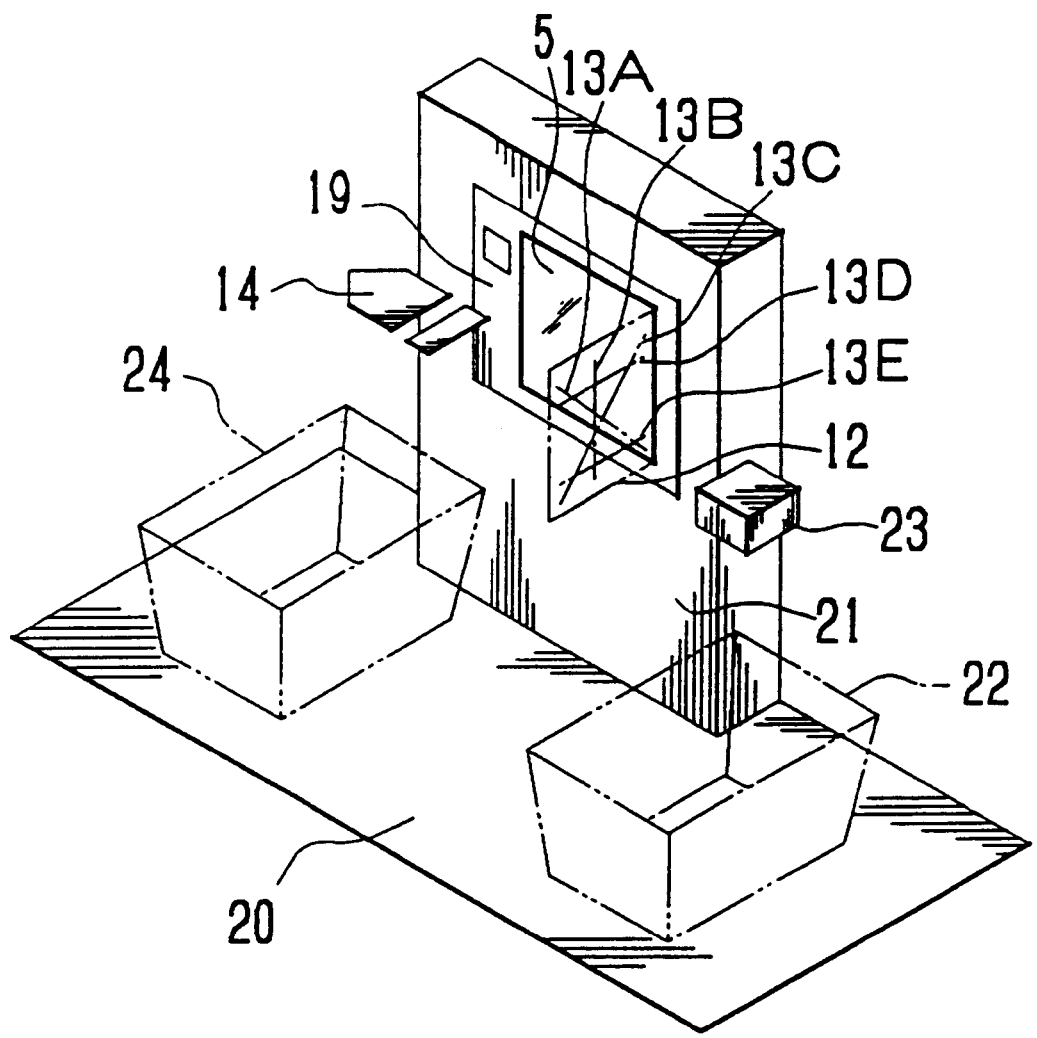
FIG. 25 is a perspective view for explaining a vertical type checkout lane.
Figure 26:
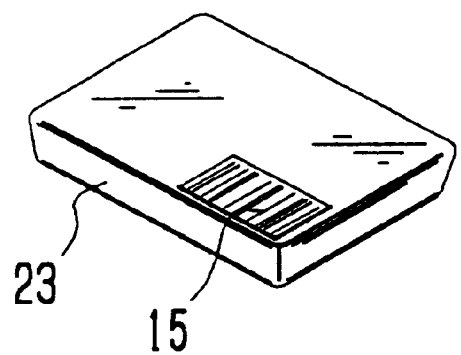
FIG. 26 is a perspective view of a wrapped tray.
Figure 27:
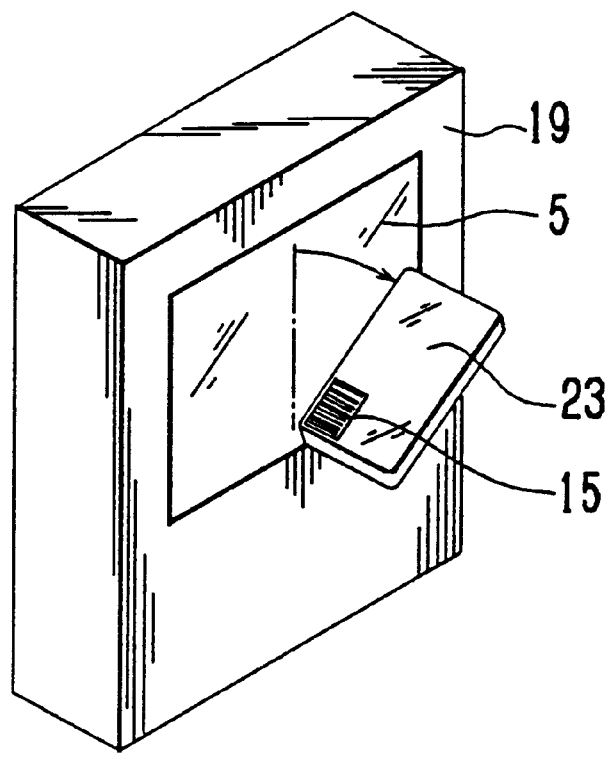
FIG. 27 is a perspective view for explaining the posture of a label which faces upward and when it is read.
Figure 28:
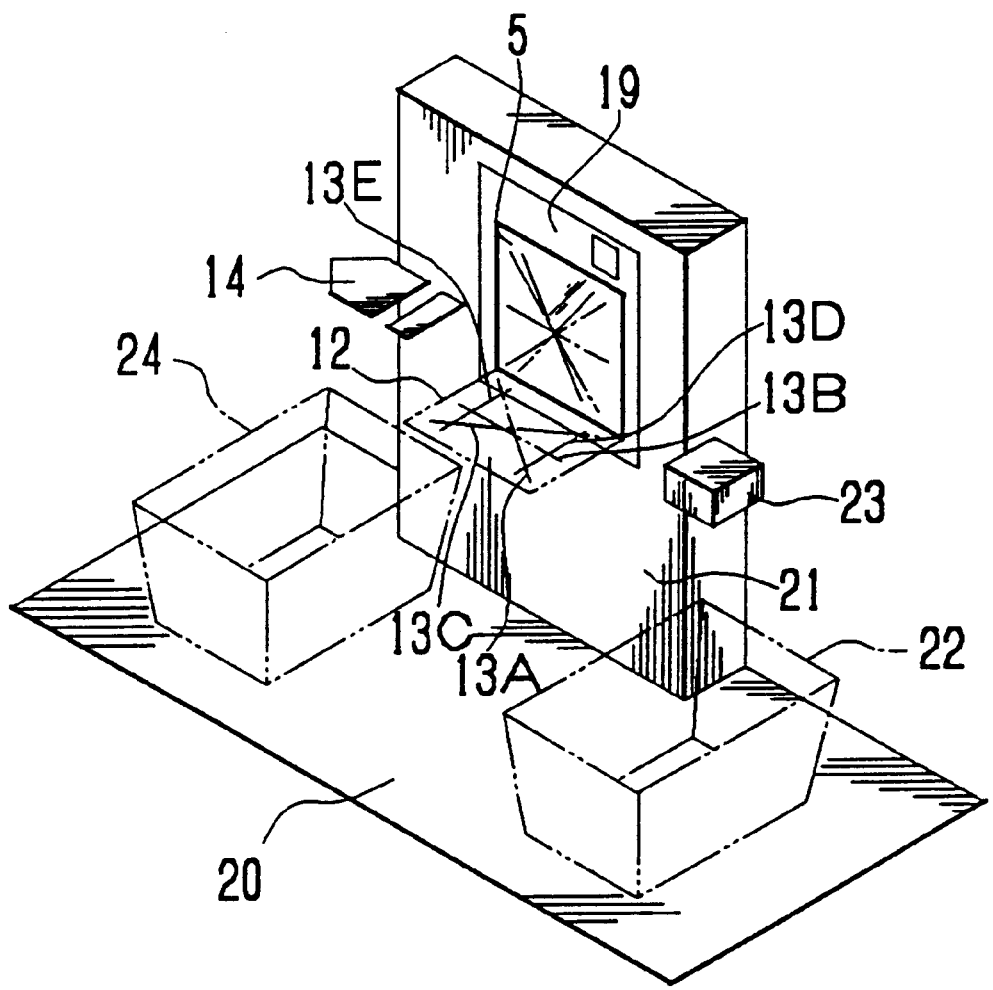
FIG. 28 is a perspective view with scanning lines radiated downward.
Figure 29:
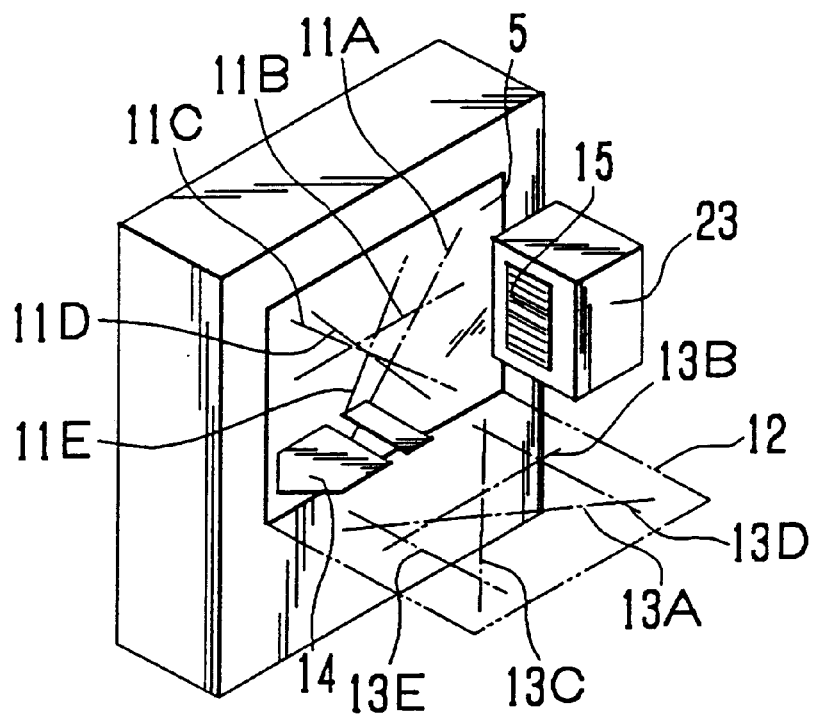
FIG. 29 is a perspective view as seen in another direction, with scanning lines radiated downward.
Figure 30:
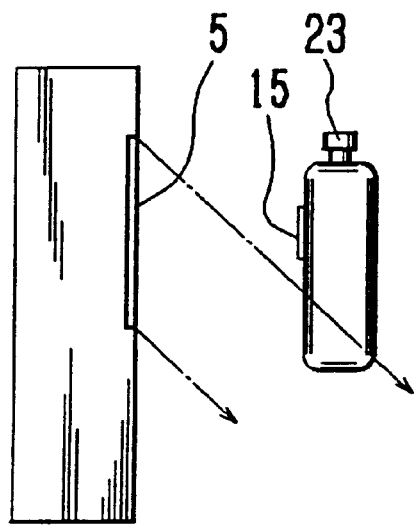
FIG. 30 is a side view as seen sideways, with scanning lines radiated downward.
Figure 31:
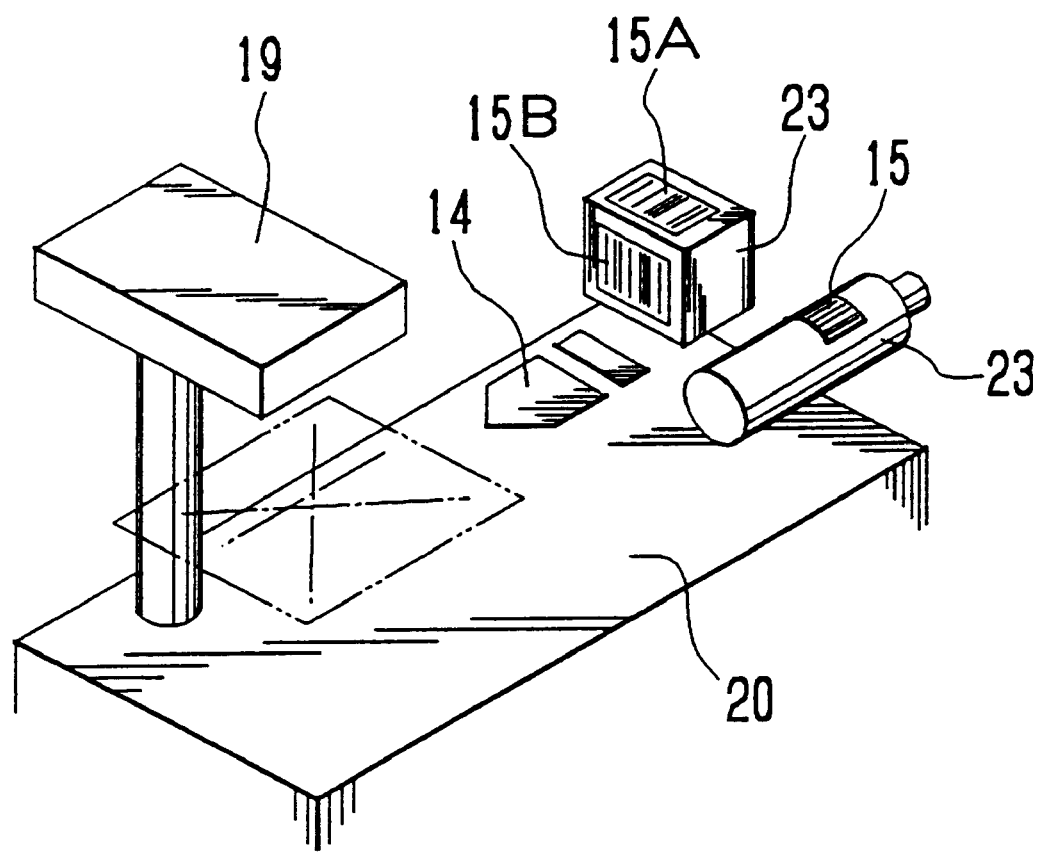
FIG. 31 is a perspective view for explaining an overhead type reader.

How the laser beam 2 is reflected by the fixed mirrors 26A, 26B1 and 26B2 is shown in FIGS. 18 and 19. FIG. 18 shows the state of reflection by the fixed mirror 26A and FIG. 19 shows the state of reflection by the combination of fixed mirrors 26B1 and 26B2.

Scanning lines 27A and 28A extending horizontally on the window 5 are generated by the fixed mirrors 26A, while scanning lines 27B and 28B extending vertically on the window 5 are generated by the set of two fixed mirrors 26B1 and 26B2.

In the optical scan system thus constructed, as shown in FIG. 11, scanning lines 27A, 27B, 28A and 28B in two directions are generated, which are emitted toward the checkout counter 20 through the window 5, in addition to the scanning lines 11A, 11B, 11C, 11D, 11E, 13A, 13B, 13C, 13D and 13E in five directions which have been explained previously in connection with the prior art. As in the prior art, the scanning lines 11A, 11B, 11C, 11D, 11E, 13A, 13B, 13C, 13D and 13E in five directions contribute to reading a bar code label 15 advancing in the commodity advancing direction 14 in the following postures:

(a) Rotation around Yaw axis 16
    $-45° \leq Yaw \leq +45°$
(b) Rotation around Pitch axis 17
    $-45° \leq Pitch \leq +45°$
(c) Rotation around Rotate axis 18
    $-180° \leq Rotate \leq +180°$ Further, the scanning lines 27A, 27B, 28A and 28B in two directions contribute to reading a bar code label 15 affixed to a commodity 23 in a tray or the like and which faces upward.

Figure 12:
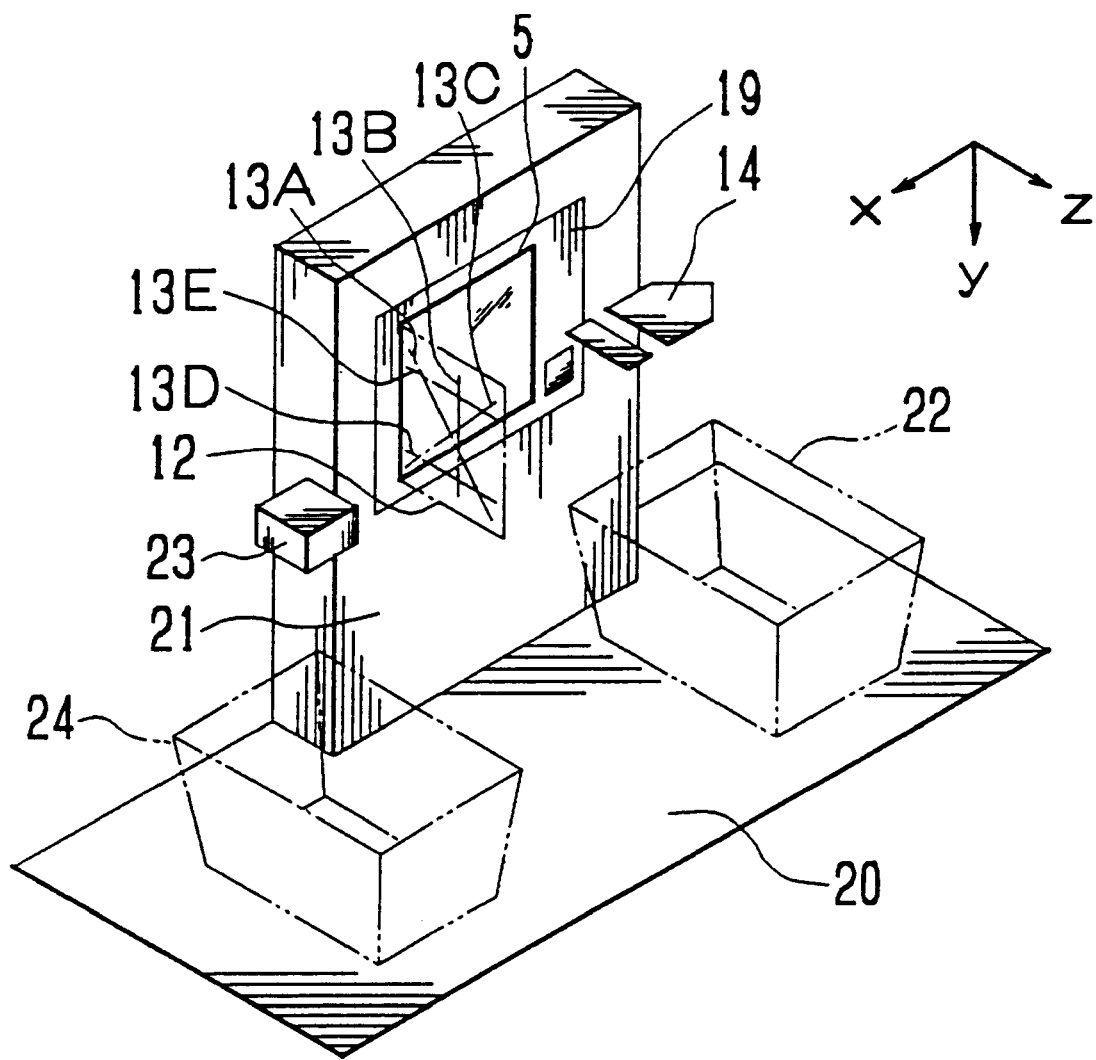
FIG. 12 is a perspective view showing a state in which a commodity has been moved in the reverse direction.

Although the above description is based on the assumption that the commodity 23 advances from the right, incoming-side basket 22 toward the left, outgoing-side basket 24, a certain type of store requires the commodity 23 to be moved from the left to the right side, as shown in FIG. 12. In this case, by disposing the scanner in a 180°-turned direction relative to the ordinary scanner installed direction, as in FIG. 12, it is possible to direct scanning lines toward the commodity 23 which is coming in from the inlet basket 24 side. In this embodiment, when the scanner installed direction is turned 180°, scanning lines generated by the plural, second fixed mirrors 26A, 26B1 and 26B2 are emitted upward from below.

Figure 5:
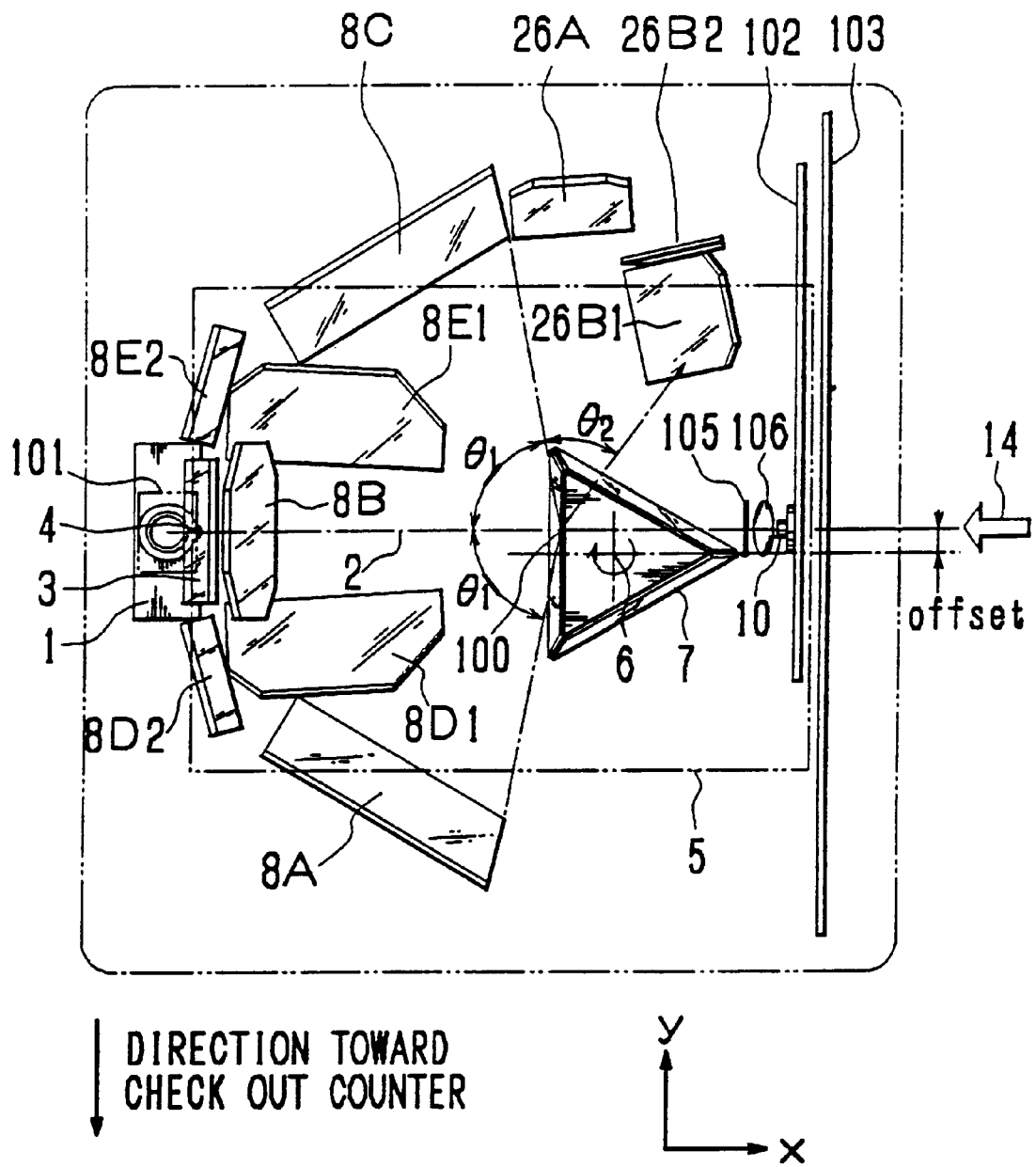
FIG. 5 is a plan view thereof.
Figure 6:
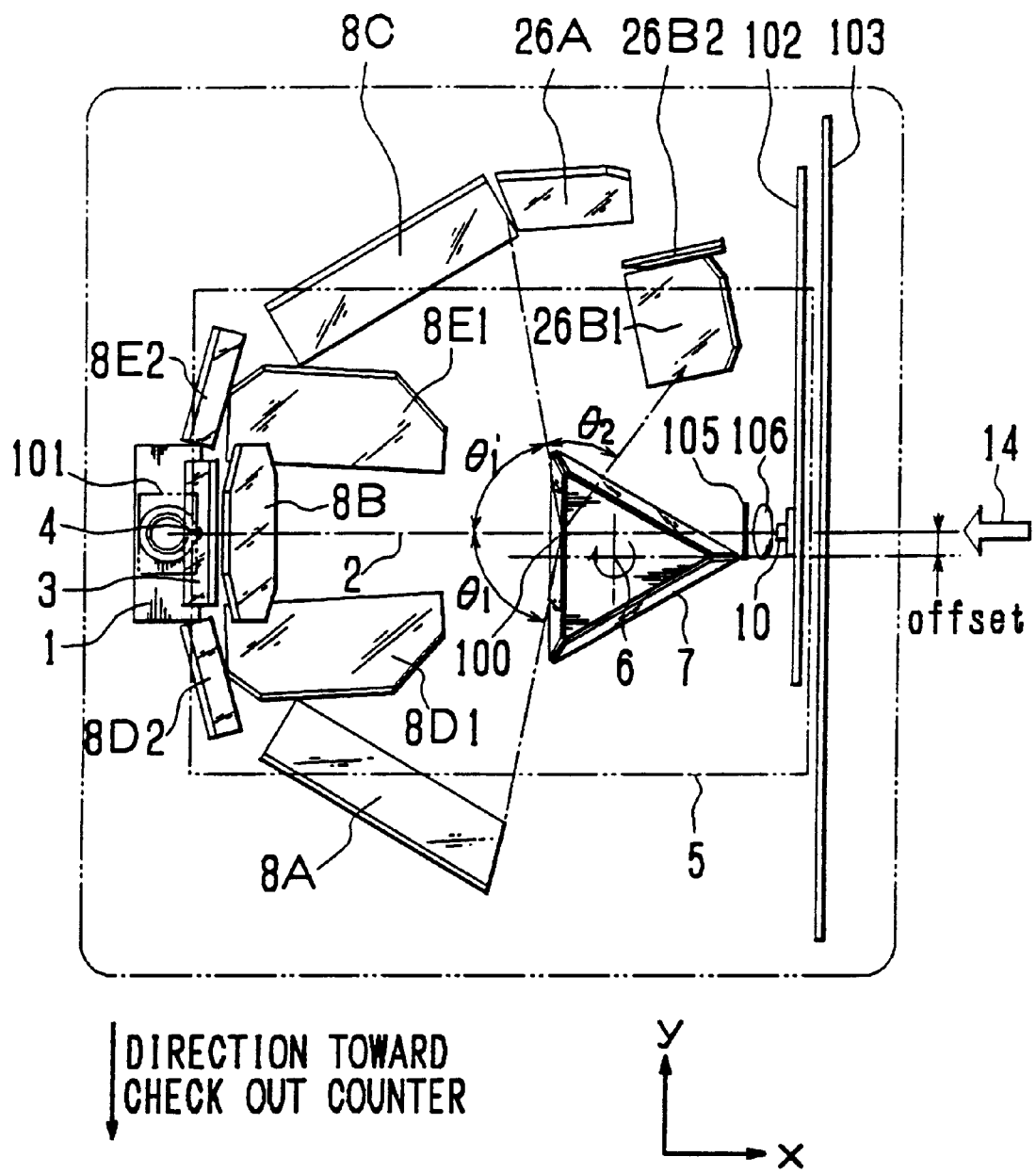
FIG. 6 is a plan view of an optical scan system capable of affording an apparatus suitable for the reading of a label which faces upward.
Figure 7:
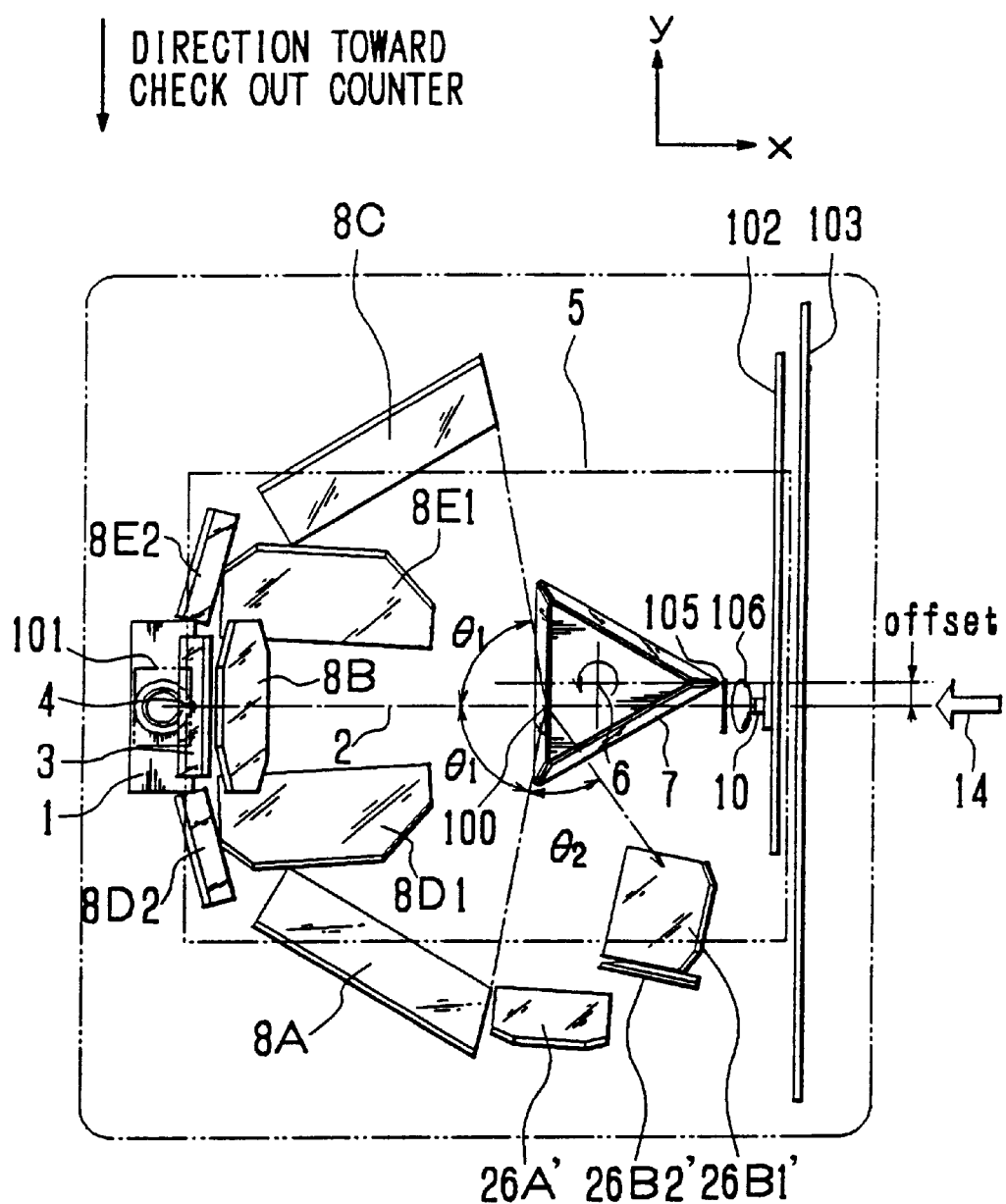
FIG. 7 is a plan view of an optical scan system, showing an example in which the scanning direction can be reversed.

As shown in FIG. 7, however, if the mounting position of the rotary scan mirror 7 used in the embodiment described in FIG. 5 is changed to a symmetric position with respect to the laser beam 2 and if the second fixed mirrors 26A, 26B1 and 26B2 are installed respectively at symmetric positions 26A', 26B1' and 26B2' with respect to the laser beam 2, scanning lines can be directed to the counter surface from above even when the scanner is disposed at a 180°-turned position.

Figure 8:
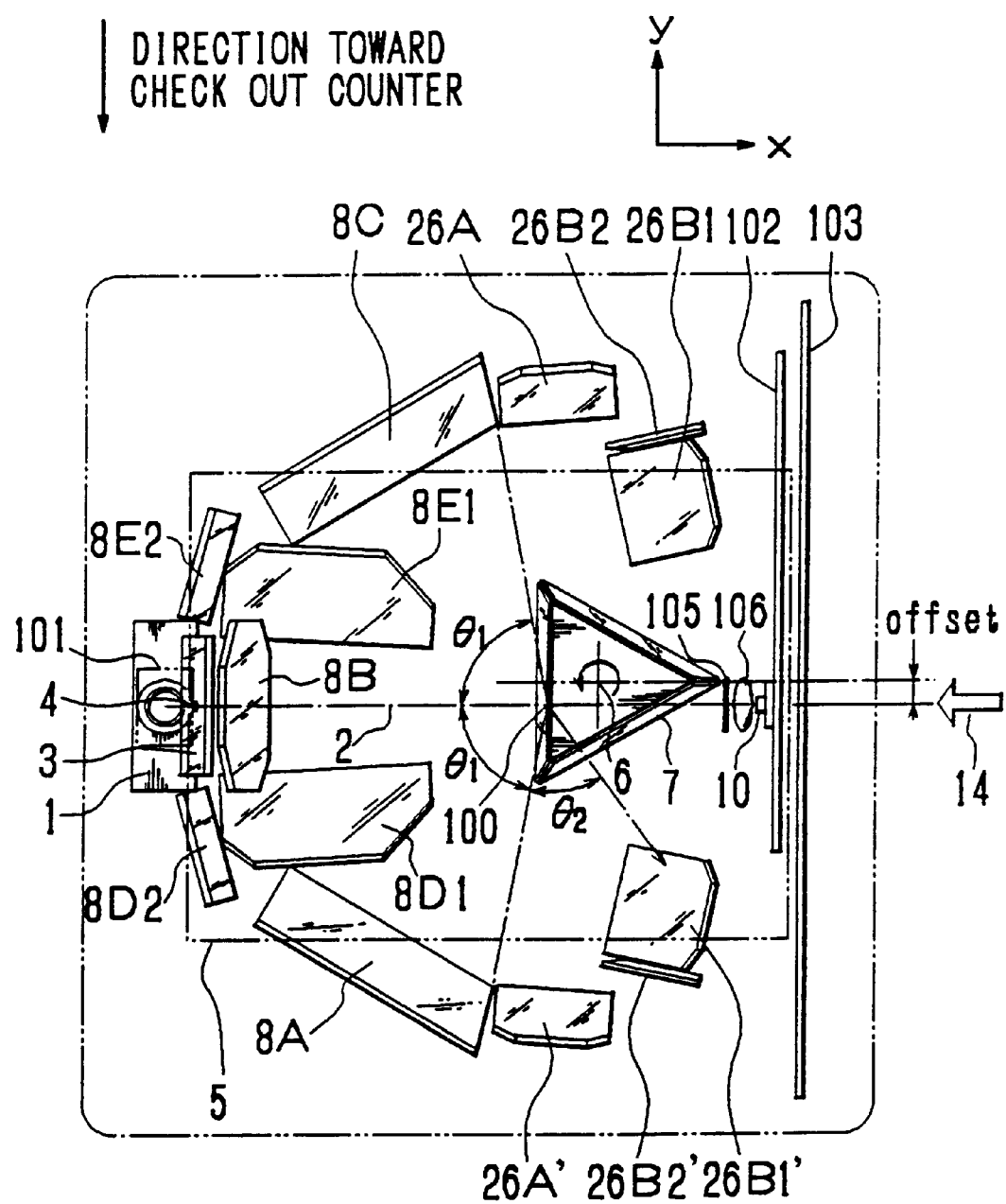
FIG. 8 is a plan view of an optical scan system pre-adjusted to permit scanning in different directions.
Figure 9:
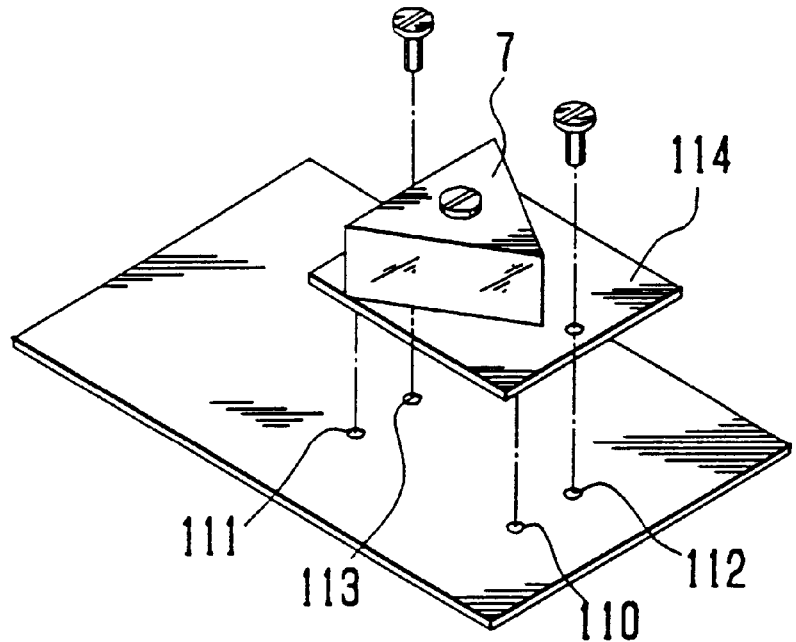
FIG. 9 is an exploded perspective view of a structure which permits selection of a scanner position.
Figure 10:
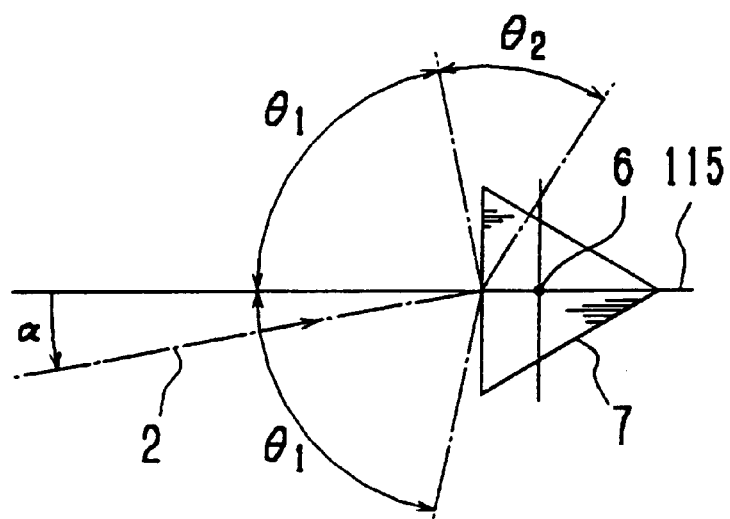
FIG. 10 is a plan view showing a modification.

As shown in FIG. 8, if all of the fixed mirrors 26A, 26B1, 26B2 and the fixed mirrors 26A', 26B1', 26B2' are mounted in advance or if there is provided a mechanism (not shown) capable of mounting all of them, and as shown in FIG. 9, if there are formed not only scanner mounting tapped holes 110 and 111 for a checkout lane on which the commodity 23 advances from right to left, but also scanner mounting tapped holes 112 and 113 for a checkout lane on which the commodity 23 advances from left to right, the mounting position of a motor 114 with the rotary scan mirror 7 attached thereto can be changed according to which of the checkout lanes is used, and thus the apparatus can be applied easily to both checkout lanes. Thus, a mechanism is formed in which the rotational axis of the rotary scan mirror 7 can be located either at a position displaced a distance of $+L_1$ from a plane in the normal line direction of the plane which plane includes the optical axis of the laser beam and which is parallel to the counter surface, or at a position displaced a distance of $-L_2$ in the normal line direction of the plane.

Although in the above description the scan range for the first fixed mirrors by the rotary scan mirror 7 is assumed to be from $-\theta_1$ to $\theta_1$ based on the laser beam 2, it is not necessary that this scan range be strictly bisected by the laser beam 2. For example, when a scanner improved in its reading performance for an upward label is designed, the scan angle range is set at $\theta_1 > \theta_1'$ as in FIG. 6 and scan beams 9 in the range of $\theta_1 - \theta_1$ are distributed to the side where scanning lines are generated by the second fixed mirrors, whereby it becomes possible to generate long scanning lines which are radiated downward and hence the reading performance for upward labels is improved to a greater extent. If an approximate condition of $|\theta_1-\theta_1|\leq 20°$ is satisfied, it is possible to expect the attainment of a desired effect.

Although in this embodiment the rotational axis 6 of the rotary scan mirror 7 is located at a position displaced a predetermined distance of offset relative to the laser beam 2 so that the rotary scan mirror scans the angular range of $-\theta_1$ to $\theta_1$ and $\theta_1$ to $\theta_2$, the laser beam 2 may be directed to the rotary scan mirror 7 in a direction inclined by an angle of a relative to an axis 115 which is parallel to the commodity advancing direction 14, where by it is possible to scan the angular range of $-\theta_1$ to $\theta$ and $\theta$ to $\theta_2$ as in this embodiment. In this case, the optical axis of the laser beam 2 is substantially displaced from the rotational axis 6 of the rotary scan mirror 7. Thus, the arrangement of parts in the apparatus can be changed as necessary to attain an effective utilization of space.

The following description is now provided about arrangement conditions of optical components suitable for practicing the present invention. In the following data, R(x, y, z) stands for x, y and z values in mm of a position vector of each related component, t(x, y, z) stands for x, y and z components of a direction cosine unit vector in the advancing direction or of axis, T(x, y, z) stands for x, y and z components of a direction unit vector in a direction perpendicular to the surface of a related component, and a coordinate origin is the point 100 at which the laser beam 2 intersects the rotary scan mirror.

X axis faces in the direction opposite to the commodity advancing direction, Z axis faces in a direction perpendicular to the window surface and away from the window, and Y axis faces in an outer product direction of X and Z axes.

In this concrete example, the foregoing values of $\theta_1$, $\theta_2$ and offset are 80°, 54° and 6 mm, respectively.

| Laser Axis | | | |
|---|---|---|---|
| R (x, y, z) | −136.6824 | 0 | 37.7512 |
| t (x, y, z) | 0.9639 | 0 | −0.2662 |
| Read Window | | | |
| R (x, y, z) | 0 | 0 | 50 |
| T (x, y, z) | 0 | 0 | 1 |
| Rotational Axis of Rotary scan mirror | | | |
| R (x, y, z) | 13.6864 | −6 | 12.5000 |
| t (x, y, z) | 0 | 0 | 1 |
| Rotary scan mirror, 1st Surface | | | |
| R (x, y, z) | 0 | 0 | 0 |
| T (x, y, z) | 0.99862 | 0 | 5.23359E-02 |
| Rotary scan mirror, 2nd Surface | | | |
| R (x, y, z) | 0 | 0 | 0 |
| T (x, y, z) | −0.99691 | 0 | 7.84590E-02 |
| Rotary scan mirror, 3rd Surface | | | |
| R (x, y, z) | 0 | 0 | 0 |
| T (x, y, z) | −0.99452 | 0 | 0.10452 |
| Fixed Mirror 8A | | | |
| R (x, y, z) | −45.2595 | −69.6935 | 0 |
| T (x, y, z) | 0.47999 | 0.73912 | 0.47255 |
| Scan angle range | −80 to −44 (deg) | | |
| Fixed Mirror 8D1 | | | |
| R (x, y, z) | −62.9002 | −40.8479 | 0 |
| T (x, y, z) | −4.66761E-02 | 0.66750 | 0.74314 |
| Scan angle range | −44 to −16 (deg) | | |

-continued

| Fixed Mirror 8D2 | | | |
|---|---|---|---|
| R (x, y, z) | −81.5677 | −38.0356 | 0 |
| T (x, y, z) | 0.96192 | 0.24877 | 0.11320 |
| Scan angle range | −44 to −16 (deg) | | |
| Fixed Mirror 8B | | | |
| R (x, y, z) | −79 | 0 | 0 |
| T (x, y, z) | 0.90258 | 0 | 0.43051 |
| Scan angle range | −16 to 16 (deg) | | |
| Fixed Mirror 8E1 | | | |
| R (x, y, z) | −62.9002 | 40.8479 | 0 |
| T (x, y, z) | −4.6676E-02 | −0.66750 | 0.74314 |
| Scan angle range | 16 to 44 (deg) | | |
| Fixed Mirror 8E2 | | | |
| R (x, y, z) | −81.5677 | 38.0356 | 0 |
| T (x, y, z) | 0.96192 | −0.24877 | 0.11320 |
| Scan angle range | 16 to 44 (deg) | | |
| Fixed Mirror 8C | | | |
| R (x, y, z) | −45.2595 | 69.6935 | 0 |
| T (x, y, z) | 0.47999 | −0.73912 | 0.47255 |
| Scan angle range | 44 to 80 (deg) | | |
| Fixed Mirror 26A | | | |
| R (x, y, z) | −1.3942E-13 | 86.3 | 0 |
| T (x, y, z) | 3.95325E-02 | −0.90544 | 0.42261 |
| Scan angle range | 80 to 110 (deg) | | |
| Fixed Mirror 26B1 | | | |
| R (x, y, z) | 40.1729 | 66.8590 | 0 |
| T (x, y, z) | −0.62735 | −0.10498 | 0.77162 |
| Scan angle range | 110 to 134 (deg) | | |
| Fixed Mirror 26B2 | | | |
| R (x, y, z) | 105.5934 | 82.4986 | 0 |
| T (x, y, z) | 0.17354 | −0.98420 | 3.48994E-02 |
| Scan angle range | 110 to 134 (deg) | | |

The present invention may be embodied in order specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A bar code scanning apparatus disposed at a checkout counter having a checkout counter surface, comprising:

a laser beam source;

a scanner configured to scan a laser beam emitted from said laser beam source in a scan angle range of $-\theta_1$ to $+(\theta_1+\theta_2)$ relative to the laser beam, wherein $-\theta_1$ and $+\theta_1$ are symmetric relative to an axis of the laser beam, and $\theta_2$ is a certain angle from $\theta_1$;

a window substantially perpendicular to said checkout counter surface and which transmits therethrough scan beams scanned by said scanner to the exterior of the reader;

a plurality of first fixed mirrors configured to divide scan beams, which are generated within the scan angle range of $-\theta_1$ to $+\theta_1$, into a plurality of scanning lines generally symmetric with respect to said laser beam and to emit the scanning lines from said window; and a plurality of second fixed mirrors adapted to divide scan beams which are generated within the scan angle range of $+\theta_1$ to $+\theta_2$ and to emit the resulting scanning lines from said window toward said checkout counter.

2. A bar code scanning apparatus according to claim 1, wherein said plurality of, second fixed mirrors are at least three fixed mirrors, and the scanning lines generated thereby are approximately orthogonal in at least two directions.

3. A bar code scanning apparatus according to claim 1, wherein the laser beam emitted from said laser beam source travels through a plane nearly parallel to said counter surface and enters said scanner which has a rotational axis approximately perpendicular to said window.

4. A bar code scanning apparatus according to claim 1, wherein said scanner is a rotary polyhedral mirror in the shape of a trihedral prism.

5. A bar code scanning apparatus according to claim 1, wherein said scanner comprises a rotary polygon mirror having a rotational axis positioned in a first plane, said first plane being deviated a predetermined distance in the normal line direction of a second plane and being opposite to said second fixed mirror relative to an axis of the laser beam, said second plane including an optical axis of the laser beam and being parallel to said counter surface.

6. A bar code scanning apparatus according to claim 5, having a mechanism which permits the rotational axis of said scanner to be located at a position displaced a distance of $+L_1$ from a plane in the normal line direction of the plane which plane includes an optical axis of the laser beam and which is parallel to said counter surface or at a position displaced a distance of $-L_2$ in the normal line direction of said plane.

7. A bar code scanning apparatus according to claim 1, wherein said scanner is positioned on an extension of a laser beam emitted from said laser beam source and not parallel to said counter surface.

* * * * *